US012266477B2

(12) United States Patent
Nishibayashi

(10) Patent No.: US 12,266,477 B2
(45) Date of Patent: Apr. 1, 2025

(54) MULTILAYER CERAMIC CAPACITOR AND MOUNTING STRUCTURE OF MULTILAYER CERAMIC CAPACITOR

(71) Applicant: Murata Manufacturing Co., Ltd., Nagaokakyo (JP)

(72) Inventor: Kazuhiro Nishibayashi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 160 days.

(21) Appl. No.: 18/107,539

(22) Filed: Feb. 9, 2023

(65) Prior Publication Data
US 2023/0282418 A1 Sep. 7, 2023

(30) Foreign Application Priority Data
Mar. 1, 2022 (JP) .................... 2022-031342

(51) Int. Cl.
| *H01G 4/232* | (2006.01) |
| *H01G 2/06* | (2006.01) |
| *H01G 4/008* | (2006.01) |
| *H01G 4/012* | (2006.01) |
| *H01G 4/12* | (2006.01) |
| *H01G 4/30* | (2006.01) |

(52) U.S. Cl.
CPC ............ *H01G 4/232* (2013.01); *H01G 2/065* (2013.01); *H01G 4/008* (2013.01); *H01G 4/012* (2013.01); *H01G 4/1227* (2013.01); *H01G 4/30* (2013.01)

(58) Field of Classification Search
CPC ........ H01G 4/232; H01G 2/065; H01G 4/008; H01G 4/012; H01G 4/1227; H01G 4/30
See application file for complete search history.

(56) References Cited

U.S. PATENT DOCUMENTS

| 2012/0019982 A1 | 1/2012 | Sasaki |
| 2013/0250476 A1 | 9/2013 | Chung et al. |
| 2019/0221368 A1* | 7/2019 | Ono ........................ H01G 4/30 |
| 2020/0066453 A1* | 2/2020 | Jeong ..................... H01G 4/248 |

(Continued)

FOREIGN PATENT DOCUMENTS

| JP | 2004-111489 A | 4/2004 |
| JP | 2012-044151 A | 3/2013 |

(Continued)

*Primary Examiner* — Michael P McFadden
(74) *Attorney, Agent, or Firm* — Keating & Bennett, LLP

(57) ABSTRACT

A three-terminal multilayer ceramic capacitor includes a first internal electrode layer including a first counter electrode portion opposite to a second internal electrode layer, a first drawn electrode portion extending from the first counter electrode portion to a first end surface, and a second drawn electrode portion extending from the first counter electrode portion to a second end surface, the second internal electrode layer includes a second counter electrode portion opposite to the first internal electrode layer, a third drawn electrode portion extending from the second counter electrode portion to a first side surface, and a fourth drawn electrode portion extending from the second counter electrode portion to a second side surface. The first drawn electrode portion is bent and faces a first or second principal surface. The second drawn electrode portion is bent and faces the first or second principal surface.

20 Claims, 19 Drawing Sheets

(56) References Cited

U.S. PATENT DOCUMENTS

| | | | | |
|---|---|---|---|---|
| 2020/0152385 A1* | 5/2020 | Ishizuka | ................ | H01G 4/232 |
| 2020/0152388 A1* | 5/2020 | Jun | ........................ | H01G 4/224 |
| 2021/0020378 A1* | 1/2021 | Fukuma | ................ | H01G 4/224 |
| 2021/0104364 A1* | 4/2021 | Okuda | ................ | H01G 4/1218 |

FOREIGN PATENT DOCUMENTS

| JP | 2013-045808 A | 3/2013 |
|---|---|---|
| JP | 2013-201417 A | 10/2013 |

* cited by examiner

MULTILAYER CERAMIC CAPACITOR AND MOUNTING STRUCTURE OF MULTILAYER CERAMIC CAPACITOR

CROSS REFERENCE TO RELATED APPLICATIONS

This application claims the benefit of priority to Japanese Patent Application No. 2022-031342 filed on Mar. 1, 2022. The entire contents of this application are hereby incorporated herein by reference.

BACKGROUND OF THE INVENTION

1. Field of the Invention

The present invention relates to a multilayer ceramic capacitor and a mounting structure of the multilayer ceramic capacitor.

2. Description of the Related Art

Conventionally, a three-terminal multilayer ceramic capacitor has been known as a decoupling capacitor used to stabilize a power supply voltage supplied to an integrated circuit component (IC) operating at a high speed.

The three-terminal multilayer ceramic capacitor generally includes a ceramic body including an outer surface having a rectangular parallelepiped outer shape, the outer surface including an upper surface and a lower surface opposite to each other in a thickness direction, both side surfaces opposite to each other in a width direction, and both end surfaces opposite to each other in a length direction.

Inside the ceramic body, a plurality of first internal electrodes and a plurality of second internal electrodes are alternately arranged in a multilayer direction. Both ends of the first internal electrode extend in a direction perpendicular or substantially perpendicular to the multilayer direction, are exposed on both end surfaces of the ceramic body, and are connected to the external electrodes on both end surfaces of the ceramic body. Both ends of the second internal electrode extend in a direction perpendicular or substantially perpendicular to the multilayer direction, are exposed on a first side surface and a second side surface, and are connected to external electrodes on both side surfaces of the ceramic body (for example, see Japanese Patent Laying-Open No. 2013-201417).

SUMMARY OF THE INVENTION

In order for the three-terminal multilayer ceramic capacitor to achieve good performance, it is preferable to keep a value of equivalent series inductance (hereinafter, referred to as ESL) low (hereinafter, referred to as a low ESL characteristic).

Accordingly, preferred embodiments of the present invention provide multilayer ceramic capacitors and mounting structures of multilayer ceramic capacitors each capable of improving low ESL characteristics.

A multilayer ceramic capacitor according to a preferred embodiment of the present invention includes a multilayer body that includes a plurality of laminated dielectric layers and a plurality of internal electrode layers laminated on the dielectric layers, and includes a first principal surface and a second principal surface facing each other in a multilayer direction, a first side surface and a second side surface facing each other in a width direction perpendicular or substantially perpendicular to the multilayer direction, and a first end surface and a second end surface facing each other in a length direction perpendicular or substantially perpendicular to the multilayer direction and the width direction; a first external electrode on the first end surface; a second external electrode on the second end surface; a third external electrode on the first side surface; and a fourth external electrode on the second side surface, in which the multilayer body includes an inner layer portion in which the plurality of internal electrode layers are opposite to each other, the plurality of internal electrode layers include a first internal electrode layer and a second internal electrode layer, the first internal electrode layer includes a first counter electrode portion opposite to the second internal electrode layer, a first drawn electrode portion that extends from the first counter electrode portion to the first end surface, and a second drawn electrode portion that extends from the first counter electrode portion to the second end surface, the second internal electrode layer includes a second counter electrode portion opposite to the first internal electrode layer, a third drawn electrode portion that extends from the second counter electrode portion to the first side surface, and a fourth drawn electrode portion that extends from the second counter electrode portion to the second side surface, the first drawn electrode portion includes a first bent portion, the second drawn electrode portion includes a second bent portion, a portion or an entirety of the first drawn electrode portion is bent and disposed, by the first bent portion, so as to face one of the first principal surface and the second principal surface, and a portion or an entirety of the second drawn electrode portion is bent and disposed, by the second bent portion, so as to face one of the first principal surface and the second principal surface.

In a three-terminal multilayer ceramic capacitor according to a preferred embodiment of the present invention, in the first internal electrode layer, the first drawn electrode portion includes the first bent portion, the second drawn electrode portion includes the second bent portion, a portion or an entirety of the first drawn electrode portion is disposed, by the first bent portion, so as to face one of the first principal surface and the second principal surface, and a portion or an entirety of the second drawn electrode portion is disposed, by the second bent portion, so as to face one of the first principal surface and the second principal surface. As a result, a current path from the first internal electrode layer to the mounting substrate can be made shorter than that of the conventional example.

This makes it possible to improve the low ESL characteristic in the three-terminal multilayer ceramic capacitor.

Furthermore, a mounting structure of a multilayer ceramic capacitor according to a preferred embodiment of the present invention includes a mounting substrate; and a multilayer ceramic capacitor mounted on the mounting substrate, in which the multilayer ceramic capacitor is the multilayer ceramic capacitor according to a preferred embodiment of the present invention, the mounting substrate includes a core material; a first connection conductor connected to the first external electrode on the core material; a second connection conductor connected to the second external electrode on the core material; a third connection conductor connected to the third external electrode on the core material; and a fourth connection conductor connected to the fourth external electrode on the core material, and the multilayer ceramic capacitor is mounted such that the first principal surface or the second principal surface faces a mounting substrate side and such that a distance between the first drawn electrode portion and the second drawn electrode portion extended to the first end surface and the second end surface closest to the first principal surface or closest to the second principal surface and a mounting surface of the mounting substrate becomes a shortest distance.

In addition, in a mounting structure of a three-terminal multilayer ceramic capacitor according to a preferred embodiment of the present invention, the current path from the first internal electrode layer to the mounting substrate of the three-terminal multilayer ceramic capacitor can be made shorter than that of the conventional example by directly reflecting various actions of a three-terminal multilayer ceramic capacitor according to a preferred embodiment of the present invention. As a result, an effect of improving the low ESL characteristic in the mounting structure of the three-terminal multilayer ceramic capacitor is exhibited by reflecting various effects of a three-terminal multilayer ceramic capacitor according to a preferred embodiment of the present invention.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A. First Preferred Embodiment a. Three-Terminal Multilayer Ceramic Capacitor A three-terminal multilayer ceramic capacitor 100 will be described as an example of the three-terminal multilayer ceramic capacitor according to the first preferred embodiment of the present invention.

Figure 1:
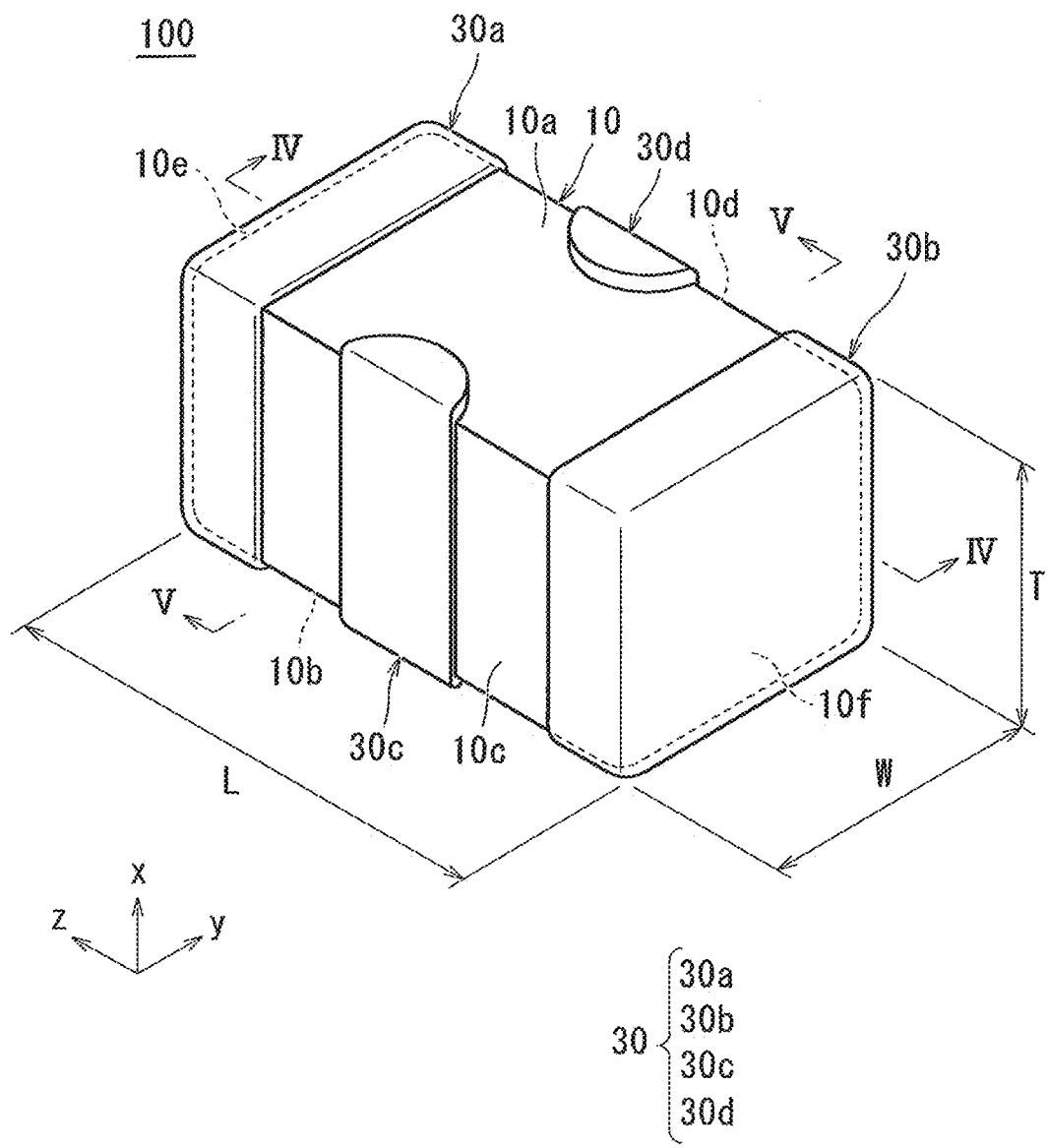
FIG. 1 is an external perspective view illustrating an example of a three-terminal multilayer ceramic capacitor according to a first preferred embodiment of the present invention.
Figure 2:
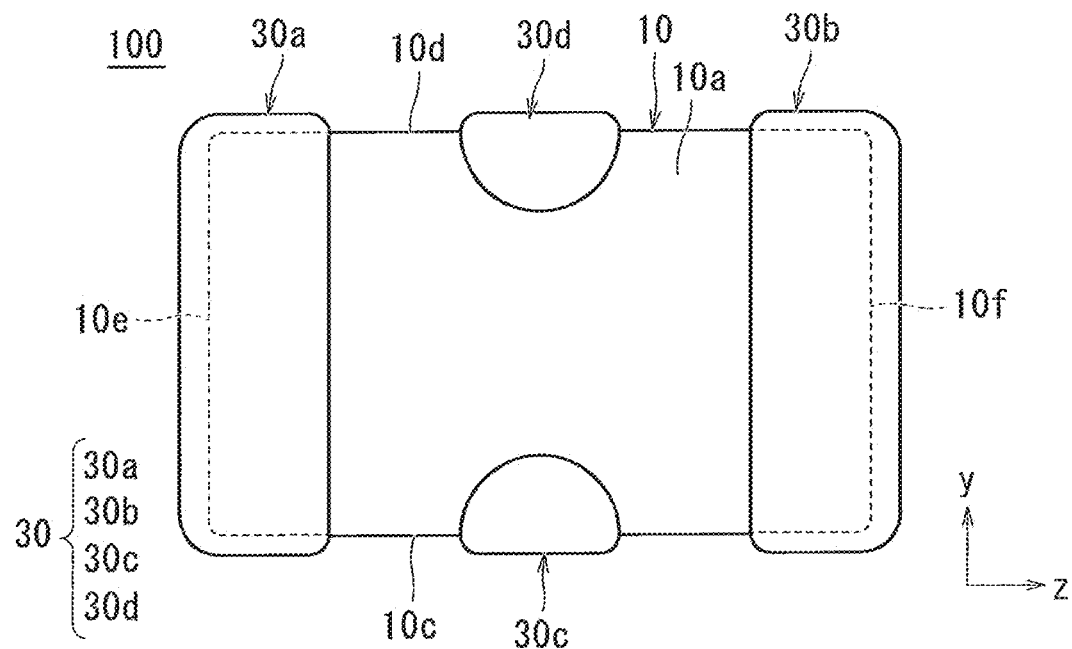
FIG. 2 is a plan view illustrating an example of the three-terminal multilayer ceramic capacitor according to the first preferred embodiment of the present invention.
Figure 3:
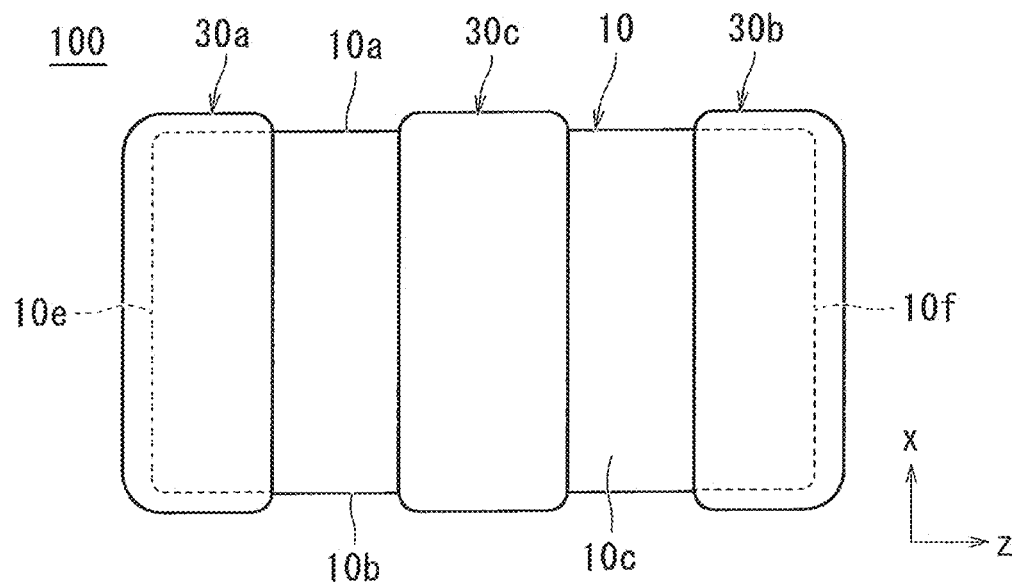
FIG. 3 is a front view illustrating an example of the three-terminal multilayer ceramic capacitor according to the first preferred embodiment of the present invention.
Figure 4:
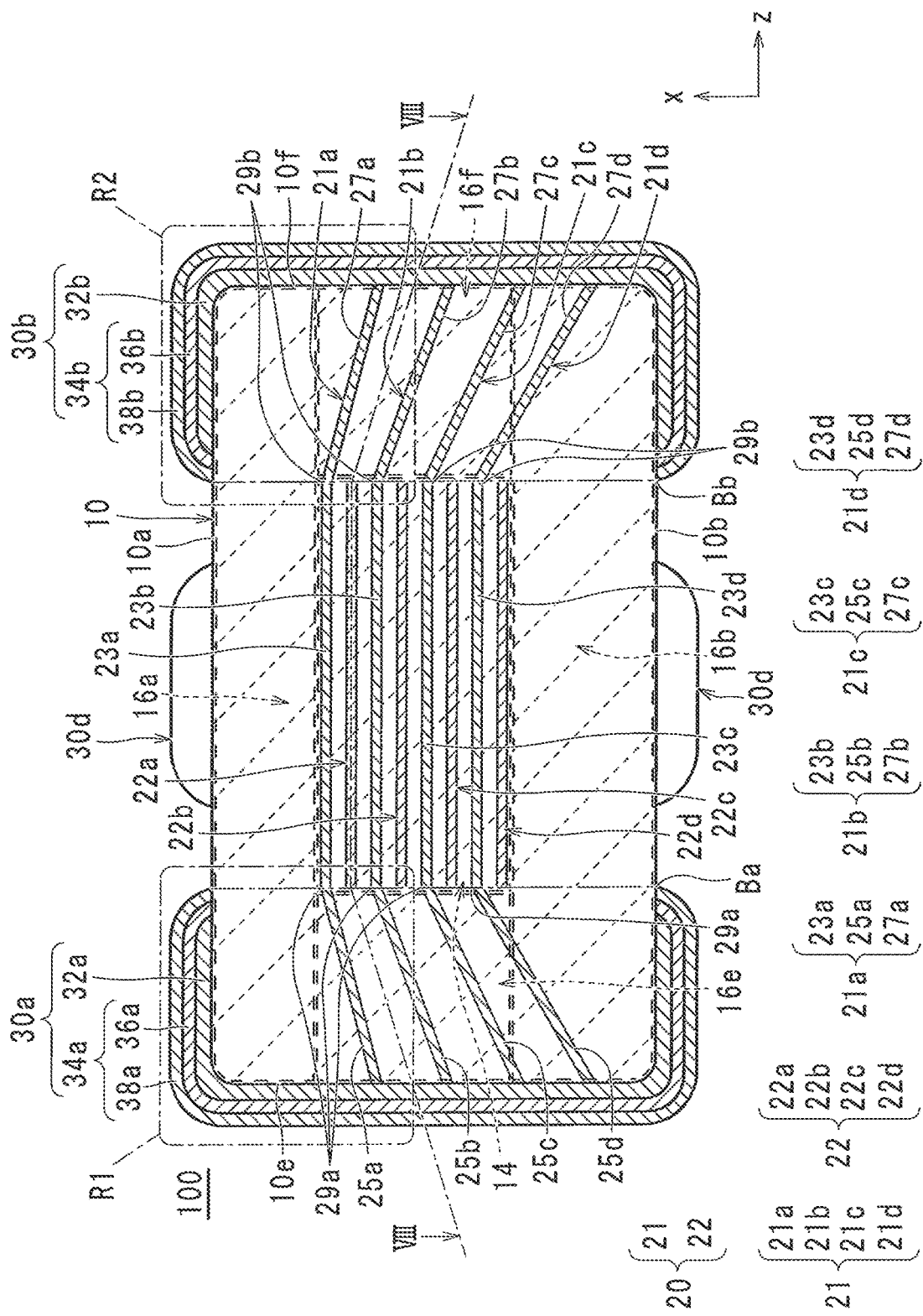
FIG. 4 is a sectional view taken along a line IV-IV in FIG. 1.
Figure 5:
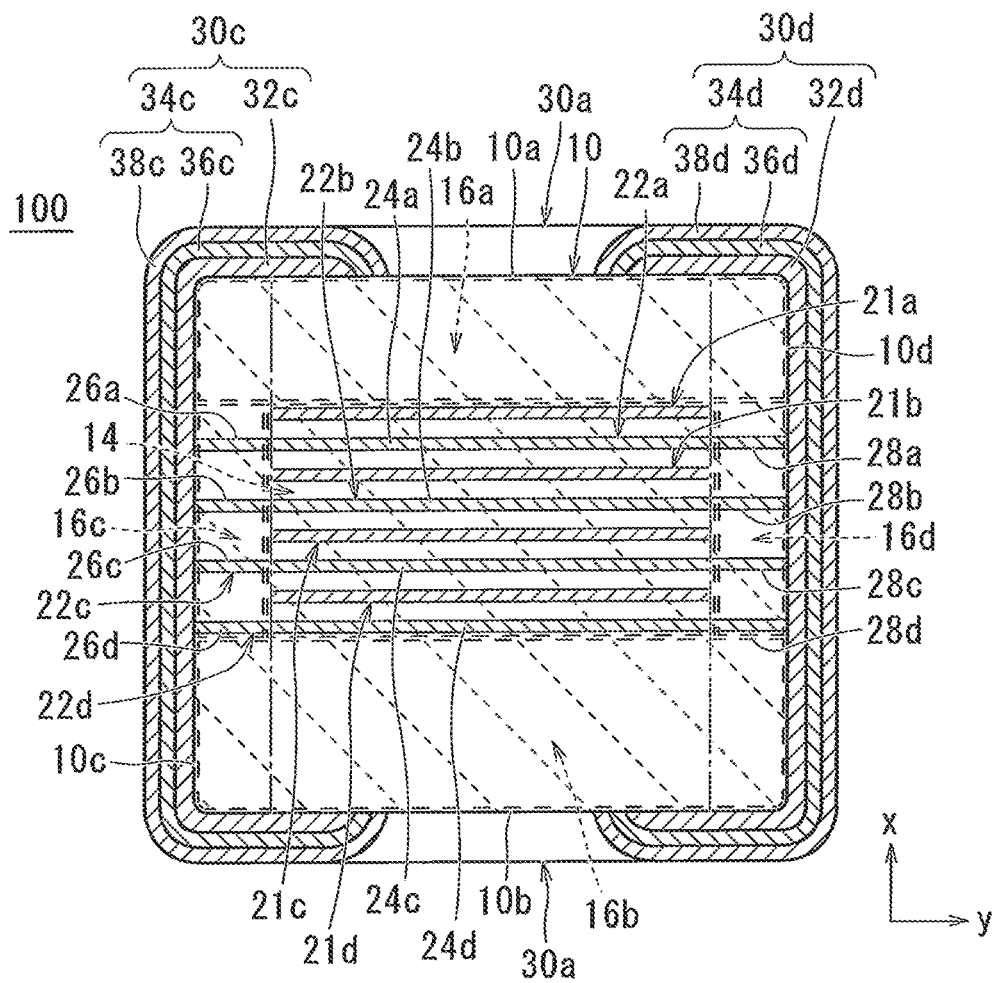
FIG. 5 is a sectional view taken along a line V-V in FIG. 1.

FIG. 1 is an external perspective view illustrating an example of a three-terminal multilayer ceramic capacitor according to a first preferred embodiment of the present invention. FIG. 2 is a plan view illustrating an example of the three-terminal multilayer ceramic capacitor according to the first preferred embodiment of the present invention. FIG. 3 is a front view illustrating an example of the three-terminal multilayer ceramic capacitor according to the first preferred embodiment of the present invention. FIG. 4 is a sectional view taken along a line IV-IV in FIG. 1. FIG. 5 is a sectional view taken along a line V-V in FIG. 1.

As illustrated in FIGS. 1 to 5, three-terminal multilayer ceramic capacitor 100 includes a multilayer body 10 and an external electrode 30 disposed on a surface of multilayer body 10.

Multilayer body 10 includes a laminated plurality of dielectric layers 12 and a plurality of internal electrode layers 20 laminated on dielectric layers 12. Each of the plurality of internal electrode layers 20 is individually disposed on each of the plurality of dielectric layers 12. Accordingly, each of the plurality of internal electrode layers 20 is disposed between the laminated plurality of dielectric layers 12.

Furthermore, multilayer body 10 includes a first principal surface 10a and a second principal surface 10b opposite to each other, a first side surface 10c and a second side surface 10d opposite to each other while coupling between first principal surface 10a and second principal surface 10b, and a first end surface 10e and a second end surface 10f opposite to each other in a direction perpendicular or substantially perpendicular to first side surface 10c and second side surface 10d while coupling between first principal surface 10a and second principal surface 10b. In multilayer body 10, a corner and a ridge are rounded. The corner is a portion in which three adjacent surfaces of multilayer body 10 intersect with one another, and the ridge is a portion in which two adjacent surfaces of multilayer body 10 intersect with each other.

Irregularities or the like may be entirely or partially provided in first principal surface 10a and second principal surface 10b, first side surface 10c and second side surface 10d, and first end surface 10e and second end surface 10f.

Here, a direction connecting first principal surface 10a and second principal surface 10b of multilayer body 10 is defined as a multilayer direction x, a direction connecting first side surface 10c and second side surface 10d in a direction perpendicular or substantially perpendicular to multilayer direction x is defined as a width direction y, and a direction connecting first end surface 10e and second end surface 10f perpendicular or substantially perpendicular to multilayer direction x and width direction y is defined as a length direction z. In the following description, regarding three-terminal multilayer ceramic capacitor 100 including multilayer body 10, a first external electrode 30a, and a second external electrode 30b, the dimension in length direction z is referred to as an L dimension, the dimension in multilayer direction x is referred to as a T dimension, and the dimension in width direction y is referred to as a W dimension. In the following description, these terms are used.

In multilayer body 10, the plurality of dielectric layers 12 and the plurality of internal electrode layers 20 are laminated along multilayer direction x.

Multilayer body 10 includes an inner layer portion 14 including one or the plurality of dielectric layers 12 and the plurality of internal electrode layers 20 disposed on one or the plurality of dielectric layers 12. Internal electrode layer 20 includes a first internal electrode layer 21 drawn to each of first end surface 10e and second end surface 10f, and a second internal electrode layer 22 drawn to each of first side surface 10c and second side surface 10d. In inner layer portion 14, a plurality of first internal electrode layers 21 and a plurality of second internal electrode layers 22 opposite to each other with dielectric layer 12 interposed therebetween, so that the characteristic of the capacitor that stores an electric charge is expressed.

Multilayer body 10 includes a first principal surface-side outer layer portion 16a that is located on the side of first principal surface 10a and including a plurality of dielectric layers 12 located between first principal surface 10a and the outermost surface of inner layer portion 14 on the side of first principal surface 10a and a plane including the outermost surface.

Similarly, multilayer body 10 includes a second principal surface-side outer layer portion 16b that is located on the side of second principal surface 10b and including a plurality of dielectric layers 12 located between second principal surface 10b and the outermost surface of inner layer portion 14 on the side of second principal surface 10b and the plane including the outermost surface.

Multilayer body 10 includes a first side surface-side outer layer portion 16c that is located on the side of first side surface 10c and including the plurality of dielectric layers 12 located between first side surface 10c and the outermost surface of inner layer portion 14 on the side of first side surface 10c.

Similarly, multilayer body 10 includes a second side surface-side outer layer portion 16d that is located on the side of second side surface 10d and including the plurality of dielectric layers 12 located between second side surface 10d and the outermost surface of inner layer portion 14 on the side of second side surface 10d.

Multilayer body 10 includes a first end surface-side outer layer portion 16e that is located on the side of first end surface 10e, located between first principal surface-side outer layer portion 16a and first principal surface-side outer layer portion 16a, and including the plurality of dielectric layers 12 located between first end surface 10e and the outermost surface of inner layer portion 14 on the side of first end surface 10e.

Multilayer body 10 includes a second end surface-side outer layer portion 16f that is located on the side of second end surface 10f, located between first principal surface-side outer layer portion 16a and first principal surface-side outer layer portion 16a, and including the plurality of dielectric layers 12 located on second end surface 10f and the outermost surface of inner layer portion 14 on the side of second end surface 10f.

The dimension of multilayer body 10 is not particularly limited.

For example, dielectric layer 12 can be made of a dielectric material as a ceramic material. For example, a dielectric ceramic including a component such as $BaTiO_3$, $CaTiO_3$, $SrTiO_3$, or $CaZrO_3$ can be used as such the dielectric material. When the dielectric material is included as a main component, for example, a material to which an accessory component having a content smaller than that of the main component such as an Mn compound, an Fe compound, a Cr compound, a Co compound, or an Ni compound is added may be used depending on the desired characteristic of multilayer body 10.

Preferably, the thickness of dielectric layer 12 after baking is greater than or equal to about 0.40 μm and less than or equal to about 5.0 μm (for example, about 0.59 μm). The number of laminated dielectric layers 12 is preferably greater than or equal to 30 and less than or equal to 2000 (for example, 234). However, the number of dielectric layers 12 is the total number of dielectric layers 12 included in inner layer portion 14 and the number of dielectric layers 12 included in first principal surface-side outer layer portion 16a and second principal surface-side outer layer portion 16b.

Multilayer body 10 includes the plurality of first internal electrode layers 21 and the plurality of second internal electrode layers 22 as the plurality of internal electrode layers 20. The plurality of first internal electrode layers 21 and the plurality of second internal electrode layers 22 are embedded so as to be alternately arranged at equal or substantially equal intervals with dielectric layer 12 interposed therebetween along multilayer direction x of multilayer body 10.

In each drawing, for the sake of simplicity of explanation, the plurality of first internal electrode layers 21 includes four first internal electrode layers 21a, 21b, 21c, and 21d arranged in order from a top to a bottom along multilayer direction x, and the plurality of second internal electrode layers 22 includes four second internal electrode layers 22a, 22b, 22c, and 22d arranged in order from the top to the bottom along multilayer direction x. However, these are examples, and the number of first internal electrode layers 21 and second internal electrode layers 22 may be any number other than the examples described later.

First internal electrode layer 21 is disposed on each of the plurality of dielectric layers 12 and is located inside multilayer body 10.

A configuration of first internal electrode layer 21 will be described below. In the following description, the configuration of first internal electrode layer 21a, the electrode layer related thereto, and the like is mainly taken as an example. However, first internal electrode layers 21b to 21d, the electrode layer related thereto, and the like also have a similar configuration.

Figure 6:
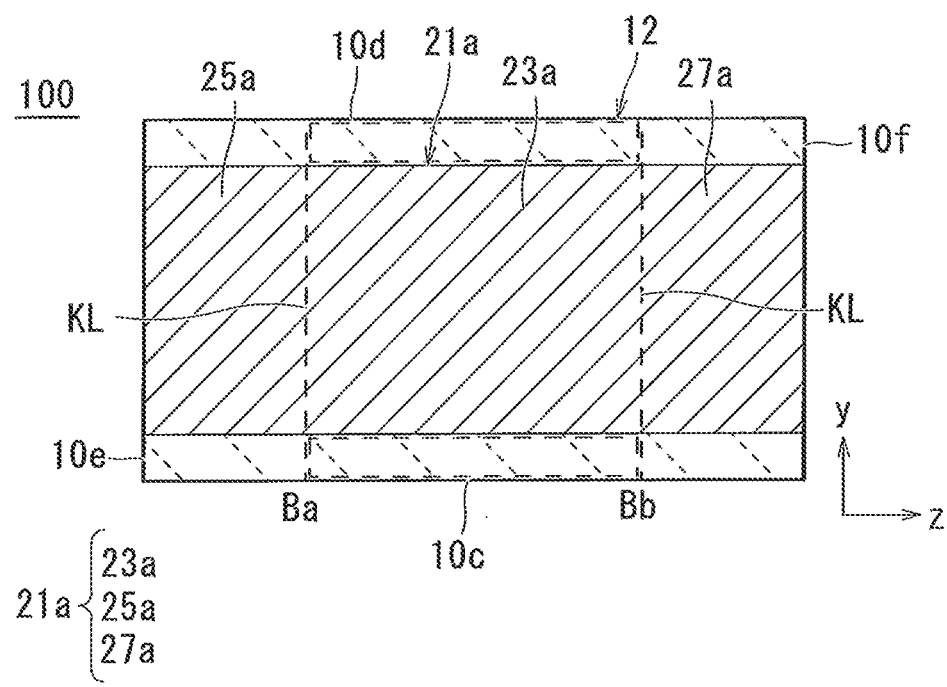
FIG. 6 is a plan view illustrating a configuration of a first internal electrode layer of the three-terminal multilayer ceramic capacitor according to the first preferred embodiment of the present invention.

As illustrated in FIG. 6, first internal electrode layer 21a has a rectangular or substantially rectangular shape as viewed in multilayer direction x, and includes a first counter electrode portion 23a opposite to second internal electrode layer 22, a first end surface-side drawn electrode portion 25a that is located on the left side along length direction z of first internal electrode layer 21, extended from first counter electrode portion 23a to the surface of first end surface 10e of multilayer body 10, and exposed from multilayer body 10, and a second end surface-side drawn electrode portion 27a that is located on the right side along length direction z of first internal electrode layer 21a, extended from first counter electrode portion 23a to surface of second end surface 10f of multilayer body 10, and exposed from multilayer body 10. Accordingly, first internal electrode layer 21a is not exposed to first side surface 10c and second side surface 10d of multilayer body 10.

Furthermore, in first internal electrode layer 21a, first end surface-side drawn electrode portion 25a includes a first bent portion 29a, and second end surface-side drawn electrode portion 27a includes a second bent portion 29b.

At this point, with appropriate reference to a main portion enlarged view illustrating a region R1 and a region R2 in FIG. 4, first bent portion 29a and second bent portion 29b in FIGS. 9A and 9B will be described.

Due to first bent portion 29a, first end surface-side drawn electrode portion 25a is bent and disposed so as to face second principal surface 10b.

Due to second bent portion 29b, second end surface-side drawn electrode portion 27a is bent and disposed so as to face second principal surface 10b.

First end surface-side drawn electrode portion 25a may be bent and arranged so as to face first principal surface 10a by first bent portion 29a, and second end surface-side drawn electrode portion 27a may be bent and arranged so as to face first principal surface 10a by second bent portion 29b.

Accordingly, when three-terminal multilayer ceramic capacitor 100 is mounted on the mounting substrate, in multilayer body 10, first end surface-side drawn electrode portion 25a of first internal electrode layer 21a is bent by first bent portion 29a toward the mounting surface of the mounting substrate on which three-terminal multilayer ceramic capacitor 100 is mounted, which faces downward along multilayer direction x with respect to the plane perpendicular or substantially perpendicular to multilayer direction x.

Thus, a connection point CN between the end of first end surface-side drawn electrode portion 25a and first external electrode 30a is shifted downward from first bent portion 29a in multilayer direction x. The same applies to other electrode layers located in first end surface-side outer layer portion 16e, and first end surface-side drawn electrode portions 25b to 25d connecting first counter electrode portions 23b to 23d of first internal electrode layers 21b to 21d and first end surface 10e are all bent toward the mounting surface of the mounting substrate on which three-terminal multilayer ceramic capacitor 100 is mounted by including first bent portion 29a.

When three-terminal multilayer ceramic capacitor 100 is mounted on the mounting substrate, in multilayer body 10, second end surface-side drawn electrode portion 27a of first internal electrode layer 21a is bent by second bent portion 29b toward the mounting surface of the mounting substrate on which three-terminal multilayer ceramic capacitor 100 is mounted, which faces downward along multilayer direction x with respect to the plane perpendicular or substantially perpendicular to multilayer direction x.

Thus, connection point CN between the end of second end surface-side drawn electrode portion 27a and second external electrode 30b is shifted downward from second bent portion 29b in multilayer direction x. The same applies to other electrode layers located in second end surface-side outer layer portion 16f, and second end surface-side drawn electrode portions 27b to 27d connecting first counter electrode portions 23b to 23d of first internal electrode layers 21b to 21d and second end surface 10f each have second bent portion 29b, so that second end surface-side drawn electrode portions 27b to 27d are bent toward the mounting surface of the mounting substrate on which three-terminal multilayer ceramic capacitor 100 is mounted.

Thus, the total length of first end surface-side drawn electrode portion 25a and second end surface-side drawn electrode portion 27a that are defined by first bent portion 29a and second bent portion 29b and inclined toward the mounting surface side of the mounting substrate of the capacitor is maximized, and a current path from first internal electrode layers 21a to 21d to the mounting substrate is located at a shortest distance, so that the low ESL characteristic in three-terminal multilayer ceramic capacitor 100 can be improved.

Furthermore, first bent portion 29a included in each of first internal electrode layers 21a to 21d is located closer to the side of inner layer portion 14 than the position of ½ of the dimension in length direction z between first end surface 10e and the outermost surface of inner layer portion 14 on the side of first end surface 10e.

Furthermore, second bent portion 29b included in each of first internal electrode layers 21a to 21d is located closer to the side of inner layer portion 14 than the position of ½ of the dimension in length direction z between second end surface 10f and the outermost surface of inner layer portion 14 on the side of second end surface 10f.

Thus, first end surface-side drawn electrode portions 25a to 25d and second end surface-side drawn electrode portions 27a to 27d are bent at an early stage, and these drawn electrode portions are drawn to the position closer to the mounting surface of the mounting substrate, so that the above-described effect of a preferred embodiment of the present invention is easily exhibited.

Figure 10:
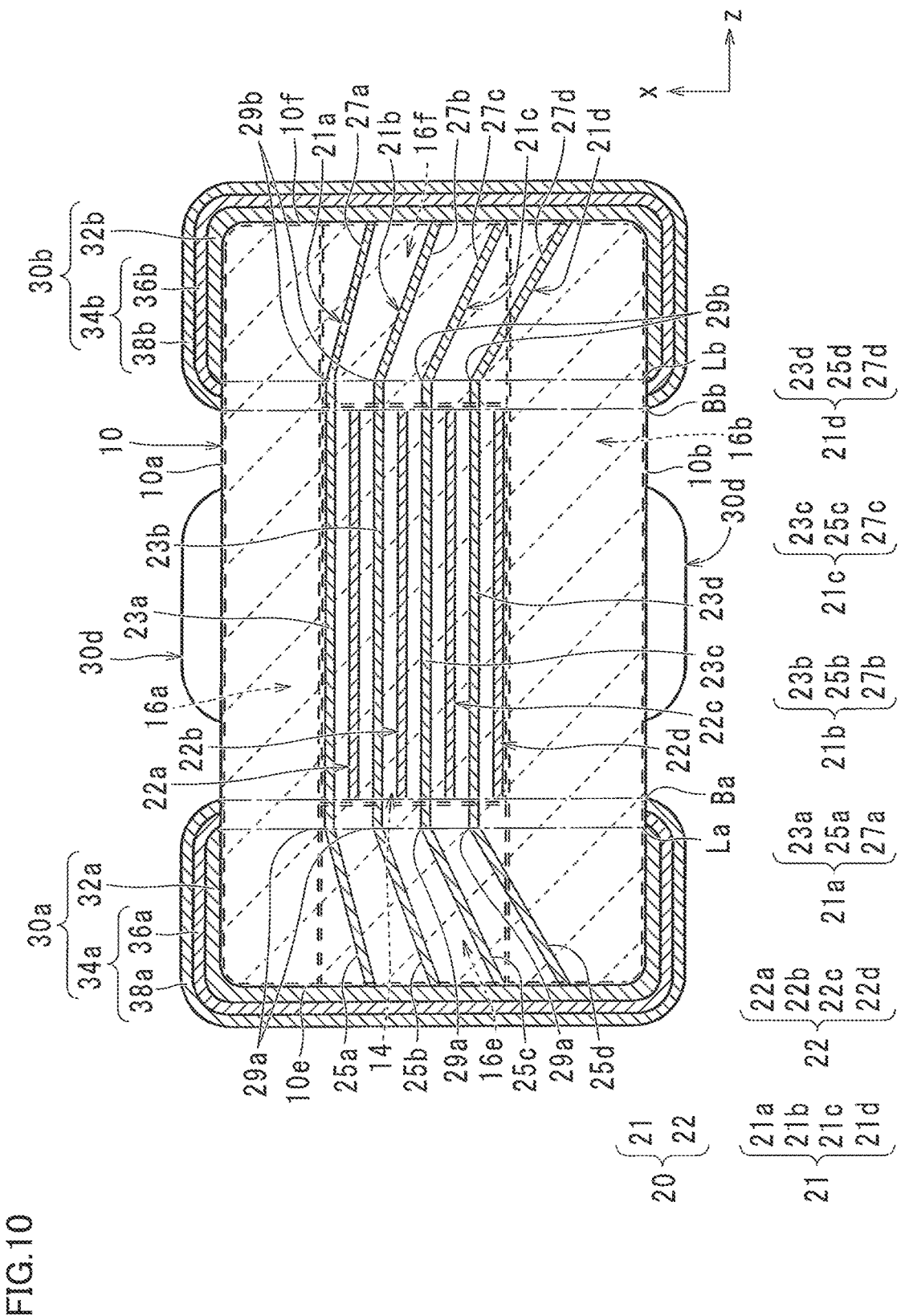
FIG. 10 is a plan view illustrating a configuration of another example of the three-terminal multilayer ceramic capacitor according to the first preferred embodiment of the present invention.

Accordingly, as illustrated in FIG. 10, each first bent portion 29a may be provided on first end surface-side drawn electrode portions 25a to 25d and second bent portion 29b at any position on first end surface-side drawn electrode portions 25a to 25d and second end surface-side drawn electrode portions 27a to 27d as long as the above conditions are satisfied as boundaries La and Lb on second end surface-side drawn electrode portions 27a to 27d.

Furthermore, in multilayer body 10, the following relationship is satisfied between the pair of adjacent first internal electrode layers 21, second internal electrode layers 22 located between first internal electrode layers 21, and dielectric layers 12 located between second internal electrode layers 22.

That is, when A1 is the thickness of dielectric layer 12 located between first internal electrode layers 21 adjacent in multilayer direction x located at the position of ½ of the dimension in length direction z between first end surface 10e and the outermost surface of inner layer portion 14 on the side of first end surface 10e, A2 is the thickness of the dielectric layer located between first internal electrode layers 21 adjacent in multilayer direction x located at the position of ½ of the dimension in length direction z between second end surface 10f and the outermost surface of inner layer portion 14 on the side of second end surface 10f, B is the thickness of dielectric layer 12 located between first internal electrode layer 21 and second internal electrode layer 22 adjacent in multilayer direction x located at the central portion of inner layer portion 14, and C is the thicknesses of first internal electrode layers 21 or second internal electrode layers 22 adjacent to each other in multilayer direction x located at the central portion of inner layer portion 14, a relationship of A1>2×B+C and A2>2×B+C is satisfied.

Thus, in multilayer body 10, first end surface-side drawn electrode portions 25a to 25d arranged in first end surface-side outer layer portion 16e and second end surface-side drawn electrode portions 27a to 27d arranged in second end surface-side outer layer portion 16f can be inclined from inner layer portion 14 toward the mounting surface side of the mounting substrate at a large bending angle, and the above-described effect achieved by preferred embodiments of the present invention can be more easily obtained.

Method for Measuring A1

When A1 is the thickness of dielectric layer 12 positioned between first internal electrode layers 21 adjacent to each other in multilayer direction x positioned at the position of ½ of the dimension in length direction z of first end surface-side outer layer portion 16e, A1 is measured by the following method.

That is, first, the section of three-terminal multilayer ceramic capacitor 100 is exposed. Specifically, polishing is performed until reaching the position of ½ W of three-terminal multilayer ceramic capacitor 100, and polishing is performed so as to be parallel or substantially parallel to first side surface 10c or second side surface 10d, thereby exposing an LT section. Subsequently, the thickness of dielectric layer 12 positioned between first internal electrode layers 21 adjacent to each other in multilayer direction x positioned at the position of ½ of the dimension in length direction z of first end surface-side outer layer portion 16e in the polished section is measured using a scanning electron microscope (SEM). At this point, the thicknesses of the total of 10 dielectric layers 12 from a side of first principal surface 10a or a side of second principal surface 10b of dielectric layers 12 located between first internal electrode layers 21 adjacent to each other of first end surface-side outer layer portion 16e are measured, and the average value thereof is taken as the dimension of A1 of one three-terminal multilayer ceramic capacitor 100.

Method for Measuring A2

When A2 is the thickness of dielectric layer 12 positioned between first internal electrode layers 21 adjacent to each other in multilayer direction x positioned at the position of ½ of the dimension in length direction z of second end surface-side outer layer portion 16f, A2 is measured by the following method.

That is, first, the section of three-terminal multilayer ceramic capacitor 100 is exposed. Specifically, the polishing is performed until reaching the position of ½ W of three-terminal multilayer ceramic capacitor 100, and the polishing is performed so as to be parallel or substantially parallel to first side surface 10c or second side surface 10d, thereby exposing the LT section. Subsequently, the thickness of dielectric layer 12 positioned between first internal electrode layers 21 adjacent to each other in multilayer direction x positioned at the position of ½ of the dimension in length direction z of second end surface-side outer layer portion 16f in the polished section is measured using the scanning electron microscope (SEM). At this point, the thicknesses of the total of 10 dielectric layers 12 from a side of first principal surface 10a or a side of second principal surface 10b of dielectric layers 12 located between first internal electrode layers 21 adjacent to each other of second end surface-side outer layer portion 16f is measured, and the average value thereof is taken as the dimension of A2 of one three-terminal multilayer ceramic capacitor 100.

Method for Measuring B

When B is the thickness of dielectric layer 12 located between first internal electrode layer 21 and second internal electrode layer 22 adjacent in multilayer direction x located at the central portion of inner layer portion 14, B is measured by the following method.

That is, first, the section of three-terminal multilayer ceramic capacitor 100 is exposed. Specifically, the polishing is performed until reaching the position of ½ W of three-terminal multilayer ceramic capacitor 100, and the polishing is performed so as to be parallel or substantially parallel to first side surface 10c or second side surface 10d, thereby exposing the LT section. Subsequently, the thickness of dielectric layer 12 located between first internal electrode layer 21 and second internal electrode layer 22 adjacent in multilayer direction x in the central portion of inner layer portion 14 in the polished section is measured using the scanning electron microscope (SEM). At this time, the thicknesses of the total of 10 dielectric layers 12 located between first internal electrode layers 21 and second internal electrode layers 22 adjacent in multilayer direction x located at the central portion of inner layer portion 14 are measured, and the average value thereof is taken as the dimension of B of one three-terminal multilayer ceramic capacitor.

Method for Measuring C

When C is the thickness of the first internal electrode layers or the second internal electrode layers adjacent to each other in the multilayer direction located at the central portion of the inner layer portion, C is measured by the following method.

That is, first, the section of three-terminal multilayer ceramic capacitor 100 is exposed. Specifically, the polishing is performed until reaching the position of ½ W of three-terminal multilayer ceramic capacitor 100, and the polishing is performed so as to be parallel or substantially parallel to first side surface 10c or second side surface 10d, thus exposing the LT section. Subsequently, at the central portion of inner layer portion 14 in the polished section, the thicknesses of first internal electrode layers 21 or second internal electrode layers 22 adjacent to each other in multilayer direction x are measured using the scanning electron microscope (SEM). At this time, the thicknesses of the total of 10 internal electrode layers adjacent to each other in first internal electrode layer 21 or second internal electrode layer 22 are measured, and the average value thereof is taken as the dimension of C of one three-terminal multilayer ceramic capacitor 100.

Although the description has been given assuming that first bent portion 29a and second bent portion 29b included in each of first internal electrode layers 21 are all bent in the same direction, the bent portion according to a preferred embodiment of the present invention may have a configuration in which some electrode layers of first internal electrode layer 21 are bent in different directions.

In the above description, first bent portion 29a and second bent portion 29b have been described as having the single bending point. However, the bending point according to a preferred embodiment of the present invention may include a plurality of bending points. Furthermore, in this case, the bent portion may be disposed such that the direction of the (first and/or second) end surface-side drawn electrode portion changes in the middle.

Furthermore, in the above description, the angles of first bent portion 29a and second bent portion 29b may increase or decrease as approaching any one of first principal surface 10a and second principal surface 10b when viewed in the section (LT section) parallel to first side surface 10c or second side surface 10d.

When viewed in the section (LT section) parallel to first side surface 10c or second side surface 10d while the conditions of the thicknesses of A1, B, and C are satisfied, the angle of the plurality of first bent portions 29a included in multilayer body 10 may be changed so as to be larger or smaller in first bent portion 29a located on the side close to second principal surface 10b.

Thus, in multilayer body 10, first end surface-side drawn electrode portions 25a to 25d disposed in first end surface-side outer layer portion 16e are disposed so as to radially extend from inner layer portion 14, and the mutual interval therebetween is larger than the mutual interval of first counter electrode portions 23a to 23d disposed in inner layer portion 14.

When viewed in the section (LT section) parallel to first side surface 10c or second side surface 10d while satisfying the conditions of the thicknesses A2, B, and C, when the thicknesses A2 are the same in second end surface-side drawn electrode portions 27a to 27d, the angles of the plurality of second bent portions 29b of multilayer body 10 may be changed such that second bent portion 29b located on the side close to second principal surface 10b is larger or smaller.

Thus, in the multilayer body 10, second end surface-side drawn electrode portions 27a to 27d disposed in second end surface-side outer layer portion 16f are disposed so as to radially extend from inner layer portion 14, and the mutual interval therebetween is larger than the mutual interval of first counter electrode portions 23a to 23d disposed in inner layer portion 14.

The angle defined by first bent portion 29a between first counter electrode portions 23a to 23d and first end surface-side drawn electrode portions 25a to 25d is preferably greater than or equal to about 0.1° and less than or equal to about 40.0°, for example.

The angle defined by second bent portion 29b between first counter electrode portions 23a to 23d and second end surface-side drawn electrode portions 27a to 27d is preferably greater than or equal to about 0.1° and less than or equal to about 40.0°, for example.

Figure 8:
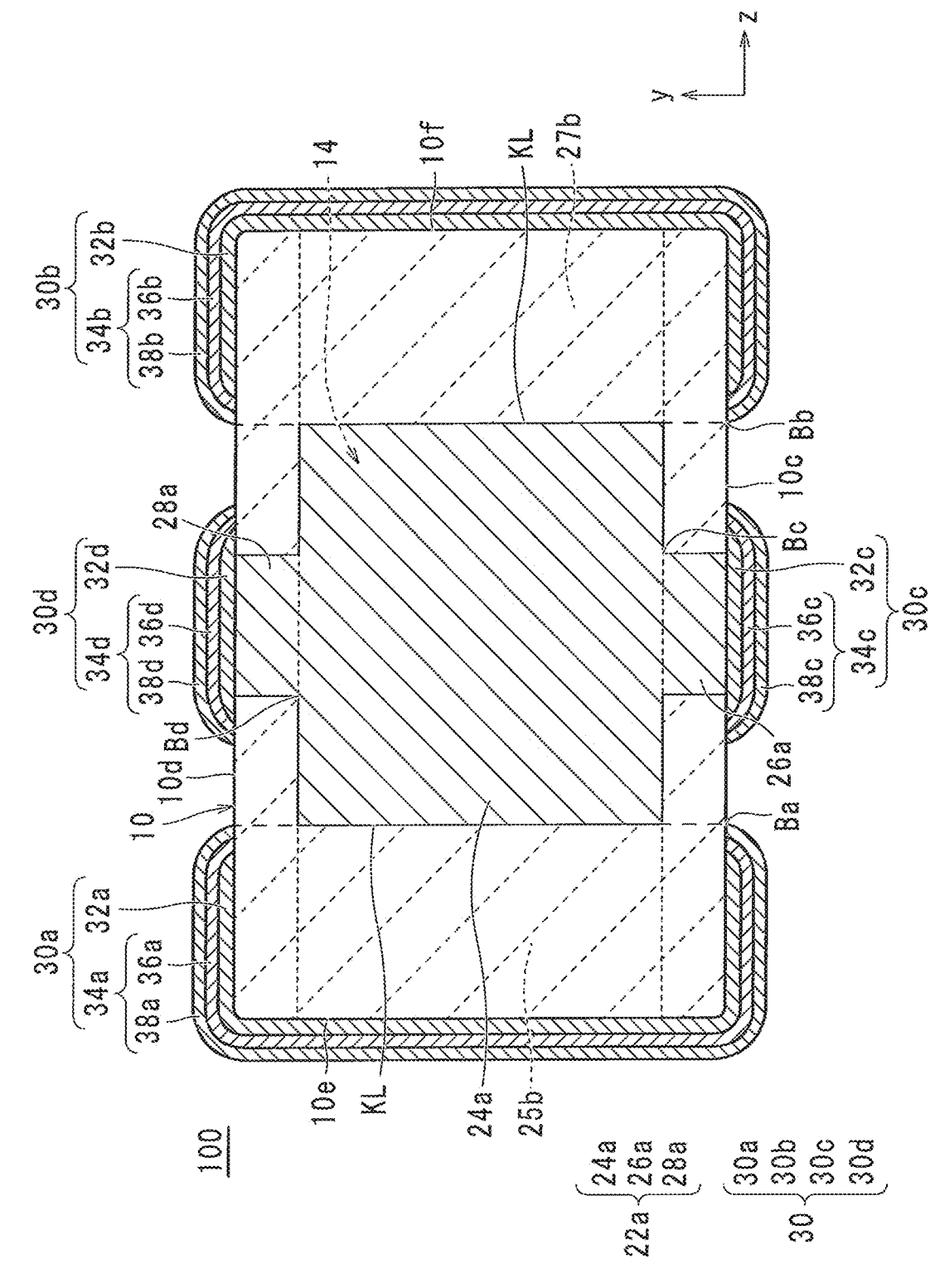
FIG. 8 is a sectional view taken along a line VIII-VIII in FIG. 4.

As illustrated in FIG. 8, first bent portion 29a appears as a pair of ridge portions KL defined by first counter electrode portion 23a and first end surface-side drawn electrode portion 25a intersecting with each other as viewed in multilayer direction x.

In addition, as illustrated in FIG. 8, second bent portion 29b appears as the pair of ridge portions KL defined by first counter electrode portion 23a and second end surface-side drawn electrode portion 27a intersecting each other as viewed in multilayer direction x.

The shape of first counter electrode portion 23a of first internal electrode layer 21a is not particularly limited, but as illustrated in FIG. 6, preferably first counter electrode portion 23a has a rectangular or substantially rectangular shape when viewed from multilayer direction x. However, a corner portion may be rounded when viewed in multilayer direction x, or the corner portion may be obliquely positioned when viewed in multilayer direction x (tapered shape). In addition, it may have the tapered shape as viewed in multilayer direction x that is inclined toward any direction along the length direction.

The shapes of first end surface-side drawn electrode portion 25a and second end surface-side drawn electrode portion 27a of first internal electrode layer 21a are not particularly limited, but as illustrated in FIG. 6, the shapes are preferably rectangular or substantially rectangular as viewed in multilayer direction x. However, the corner portion may be rounded when viewed in multilayer direction x, or the corner portion may be formed obliquely when viewed in multilayer direction x (tapered shape). In addition, it may have the tapered shape in multilayer direction x that is inclined toward any direction along the length direction.

Furthermore, in first internal electrode layer 21a, first counter electrode portion 23a, first end surface-side drawn electrode portion 25a, and second end surface-side drawn electrode portion 27a may have the same width, or may have a narrow width in either one of them.

Figure 7:
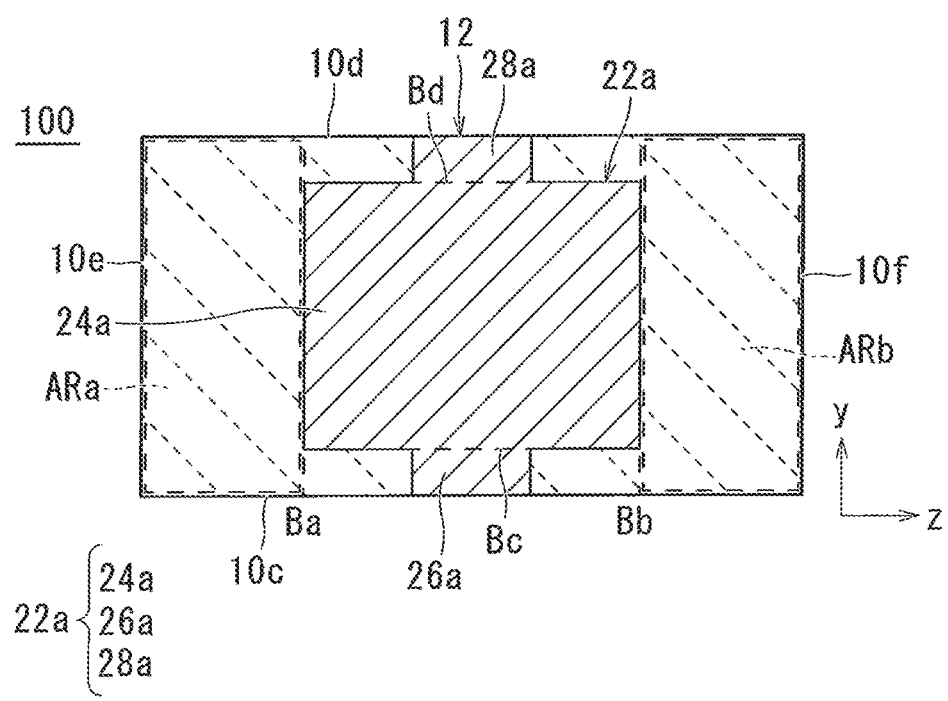
FIG. 7 is a plan view illustrating a configuration of a second internal electrode layer of the three-terminal multilayer ceramic capacitor according to the first preferred embodiment of the present invention.

The configuration of second internal electrode layer 22 will be described below. As illustrated in FIG. 7, second internal electrode layer 22 has a substantially cross shape when viewed from multilayer direction x and a flat plate shape when viewed from length direction z and the width direction y. Taking second internal electrode layer 22a as an example, second internal electrode layer 22 includes a second counter electrode portion 24a opposite to first counter electrode portion 23a of first internal electrode layer 21, a first side surface-side drawn electrode portion 26a drawn to the surface of first side surface 10c of multilayer body 10 in parallel or substantially in parallel with a second counter electrode portion 24a, and a second side surface-side drawn electrode portion 28a drawn to the surface of second side surface 10d of multilayer body 10 in parallel or substantially in parallel with second counter electrode portion 24a.

Specifically, second counter electrode portion 24a has a rectangular or substantially rectangular shape as viewed in multilayer direction x, and first side surface-side drawn electrode portion 26a extends from a boundary Bc that coincides with a side of second counter electrode portion 24a closer to first side surface 10c, and exposed to the surface of first side surface 10c of multilayer body 10. Second side surface-side drawn electrode portion 28a extends from a boundary Bd that coincides with the side of second counter electrode portion 24a closer to second side surface 10d, and exposed on the surface of second side surface 10d of multilayer body 10. Accordingly, second internal electrode layer 22 is not exposed on the surface of first end surface 10e and the surface of second end surface 10f of multilayer body 10.

The four corner portions of second counter electrode portion 24a in second internal electrode layer 22a are not chamfered in FIG. 7, but may be chamfered. Thus, the corner portion of second counter electrode portion 24a can be prevented from overlapping the corner portion of the counter electrode portion included in the first internal electrode layer such as first counter electrode portion 23a of first internal electrode layer 21, and the electric field concentration can be prevented. As a result, dielectric breakdown of the ceramic capacitor that may be generated by electric field concentration can be prevented.

The shape of second counter electrode portion 24a of second internal electrode layer 22a is not particularly limited, but is preferably a rectangular or substantially rectangular shape as viewed in multilayer direction x. However, a corner portion may be rounded when viewed in multilayer direction x, or the corner portion may be obliquely formed when viewed in multilayer direction x (tapered shape). In addition, it may have the tapered shape in multilayer direction x that is inclined toward any direction along the length direction.

The shapes of first end surface-side drawn electrode portion 25a and second side surface-side drawn electrode portion 28a of second internal electrode layer 22a are not particularly limited, but are preferably rectangular or substantially rectangular as viewed in multilayer direction x as illustrated in FIG. 7. However, the corner portion may be rounded when viewed in multilayer direction x, or the corner portion may be formed obliquely when viewed in multilayer direction x (tapered shape). In addition, it may have the tapered shape in multilayer direction x that is inclined toward any direction along the length direction.

In second internal electrode layer 22, second counter electrode portion 24a and first end surface-side drawn electrode portion 25a and second side surface-side drawn electrode portion 28a may have the same width, or have a narrow width in either one of them.

Second internal electrode layers 22b, 22c, and 22d of second internal electrode layer 22 also have the same configuration as second internal electrode layer 22a. That is, second internal electrode layers 22b, 22c, and 22d respectively include second counter electrode portions 24b, 24c, and 24d opposite to first internal electrode layer 21. In addition, second internal electrode layers 22b, 22c, and 22d have first side surface-side drawn electrode portions 26b, 26c, and 26d that reach first end surface 10e of multilayer body 10 flush with each other from second counter electrode portions 24b, 24c, and 24d. In addition, second internal electrode layers 22b, 22c, and 22d have second side surface-side drawn electrode portions 28b, 28c, and 28d that reach second end surface 10f of the multilayer body flush with each other from second counter electrode portions 24b, 24c, and 24d.

For example, first internal electrode layer 21 and second internal electrode layer 22 can be made of an appropriate conductive material such as a metal such as Ni, Cu, Ag, Pd, or Au or an alloy such as an Ag—Pd alloy that includes at least one of these metals.

The thickness of first internal electrode layer 21 is not particularly limited, but for example, preferably is greater than or equal to about 0.4 µm and less than or equal to about 5.0 µm, for example. The thickness of second internal electrode layer 22 is not particularly limited, but for example, preferably is greater than or equal to about 0.4 µm and less than or equal to about 5.0 µm, for example.

The numbers of first internal electrode layers 21 and second internal electrode layers 22 are preferably greater than or equal to 30 and less than or equal to 2000 in total.

First internal electrode layers 21 and second internal electrode layers 22 may be alternately laminated with dielectric layers 12 interposed therebetween, or a plurality of dielectric layers 12 on which first internal electrode layers 21 are disposed may be laminated, and then dielectric layers 12 on which second internal electrode layers 22 are disposed may be laminated. As described above, a laminated pattern of first internal electrode layers 21 and second internal electrode layers 22 can be changed according to a capacitance value to be achieved in three-terminal multilayer ceramic capacitor 100.

As illustrated in FIGS. 1 to 3, external electrode 30 is disposed on first side surface 10c, second side surface 10d, the side of first end surface 10e, and the side of second end surface 10f of multilayer body 10.

In three-terminal multilayer ceramic capacitor 100, external electrode 30 includes four independent electrodes, namely, a first external electrode 30a, a second external electrode 30b, a third external electrode 30c, and a fourth external electrode 30d.

First external electrode 30a is electrically connected to first internal electrode layer 21 and disposed on the surface of first end surface 10e. In addition, first external electrode 30a extends from first end surface 10e of multilayer body 10 along a contour of multilayer body 10 and is also disposed on a portion of first principal surface 10a and a portion of second principal surface 10b and a portion of first side surface 10c and a portion of second side surface 10d. In this case, first external electrode 30a is electrically connected to first end surface-side drawn electrode portion 25a to 25d of first internal electrode layer 21a to 21d.

Second external electrode 30b is electrically connected to first internal electrode layer 21 and disposed on the surface of second end surface 10f. Second external electrode 30b extends from first end surface 10e of multilayer body 10 along the contour of multilayer body 10 and is also disposed on a portion of first principal surface 10a and a portion of second principal surface 10b and a portion of first side surface 10c and a portion of second side surface 10d. In this case, second external electrode 30b is electrically connected to second end surface-side drawn electrode portion 27a to 27d of first internal electrode layer 21a to 21d.

Third external electrode 30c is connected to second internal electrode layer 22 and disposed on the surface of first side surface 10c. In addition, third external electrode 30c extends from first side surface 10c of multilayer body 10 along the contour of multilayer body 10 and is also disposed on a portion of first principal surface 10a and a portion of second principal surface 10b. In this case, third external electrode 30c is electrically connected to first side surface-side drawn electrode portions 26a to 26d of second internal electrode layers 22a to 22d.

Fourth external electrode 30d is electrically connected to second internal electrode layer 22 and disposed on the surface of second side surface 10d. In addition, fourth external electrode 30d extends from second side surface 10d of multilayer body 10 along the contour of multilayer body 10 and is also disposed on a portion of first principal surface 10a and a portion of second principal surface 10b. In this case, fourth external electrode 30d is electrically connected to second side surface-side drawn electrode portion 28a to 28d of second internal electrode layer 22a to 22d.

In multilayer body 10, as described above, as inner layer portion 14, first counter electrode portions 23a to 23d of first internal electrode layer 21 and second counter electrode portions 24a to 24d of second internal electrode layer 22 are opposite to each other with dielectric layer 12 interposed therebetween. Thus, multilayer body 10 defines and functions as a body portion of the capacitor that stores the electric charge between first external electrode 30a and second external electrode 30b to which first internal electrode layer 21 is connected and third external electrode 30c and fourth external electrode 30d to which second internal electrode layer 22 is connected.

External electrode 30 includes at least a base electrode layer 32 including a metal component and a ceramic component and a plating layer 34 as an example of the internal configuration of external electrode 30. Plating layer 34 includes a lower plating layer 36 disposed on the surface of base electrode layer 32. Furthermore, plating layer 34 of external electrode 30 preferably includes an upper plating layer 38 disposed on the surface of lower plating layer 36 similarly to the present preferred embodiment.

Base electrode layer 32 includes a first base electrode layer 32a in first external electrode 30a, a second base electrode layer 32b in second external electrode 30b, a third base electrode layer 32c in third external electrode 30c, and a fourth base electrode layer 32d in fourth external electrode 30d.

Base electrode layer 32 includes at least one selected from a baked layer, a conductive resin layer, a thin film layer, and the like. The case where base electrode layer 32 is a baked layer will be described below.

The baked layer is obtained by applying conductive paste including the glass component and the metal component to multilayer body 10 and baking the paste. The glass component of the baked layer includes at least one selected from B, Si, Ba, Mg, A1, Li, and the like. For example, the metal of the baked layer includes at least one selected from Cu, Ni, Ag, Pd, an Ag—Pd alloy, and Au.

The baked layer may be obtained by simultaneously baking a multilayer chip including first internal electrode layer 21, second internal electrode layer 22, and dielectric layer 12 as a base of multilayer body 10, and a conductive paste applied to the multilayer chip. In addition, the baked layer may be obtained by applying and baking the conductive paste to multilayer body 10 after baking the multilayer chip to obtain multilayer body 10. When the multilayer chip and the conductive paste applied to the multilayer chip are simultaneously baked, preferably a baked layer to which a dielectric material is added instead of a glass component is used.

The baked layer may be a single layer or a multilayer.

When the baked layer defines first external electrode 30a located on first end surface 10e, for example, the thickness in length direction z at the central portion in multilayer direction x is preferably greater than or equal to about 3 μm and less than or equal to about 70 μm.

When the baked layer defines second external electrode 30b located on second end surface 10f, for example, the thickness in length direction z at the central portion in multilayer direction x is preferably greater than or equal to about 3 μm and less than or equal to about 70 μm.

Furthermore, when the baked layer defines a portion of first external electrode 30a located on a portion of first principal surface 10a and a portion of second principal surface 10b, for example, the thickness in multilayer direction x at the central portion in length direction z is preferably greater than or equal to about 3 μm and less than or equal to about 40 μm.

Furthermore, when the baked layer defines a portion of second external electrode 30b located on a portion of first principal surface 10a and a portion of second principal surface 10b, for example, the thickness in multilayer direction x at the central portion in length direction z is preferably greater than or equal to about 3 μm and less than or equal to about 40 μm.

The case where base electrode layer 32 is the conductive resin layer will be described below.

When the conductive resin layer is used as base electrode layer 32, the conductive resin layer may be disposed so as to further cover the already-provided baked layer. Furthermore, the conductive resin layer may be directly disposed on multilayer body 10 without providing the baked layer. In this case, the conductive resin layer may completely cover the baked layer, or may cover a portion of the baked layer.

For example, the material of the conductive resin layer includes a conductive particle and a thermosetting resin. Because the conductive resin layer includes a thermosetting resin, the conductive resin layer is more flexible than a conductive layer including, for example, the plating film or the baked product of the conductive paste. For this reason, even when impact caused by physical impact or a thermal cycle is applied to three-terminal multilayer ceramic capacitor 100, the conductive resin layer can function as a buffer layer to prevent cracks in three-terminal multilayer ceramic capacitor 100.

On the other hand, the conductive particles included in the conductive resin layer is mainly responsible for the conductivity of the conductive resin layer. Specifically, when conductive fillers come into contact with each other, an energization path is defined inside the conductive resin layer.

The metal particles can be used as the conductive particles included in the conductive resin layer. Furthermore, Ag, Cu, Ni, Sn, Bi, or an alloy including all or a portion thereof can be used as the metal suitable for the metal particles.

Furthermore, the conductive particles obtained by coating the surfaces of the metal particles with Ag can also be used. In this case, preferably Cu, Ni, Sn, Bi or an alloy including them can be used as the metal. The reason why the metal coated with Ag is used as the conductive particle is that Ag has the lowest specific resistance among metals and thus is suitable as the electrode material, and that Ag is not oxidized and has high weather resistance because Ag is a noble metal. In addition, this is because the metal of the base material can be made less inexpensive while the characteristic of Ag is maintained.

Furthermore, the metal obtained by subjecting Cu, Ni to oxidation preventing treatment can also be used as the metal included in the conductive resin layer.

Furthermore, the metal powder obtained by coating the surface of the metal powder with Sn, Ni, Cu can also be used as the metal included in the conductive resin layer. When the metal powder coated with Sn, Ni, Cu is used, Ag, Cu, Ni, Sn, Bi, or an alloy powder is preferably used as the metal powder that is a parent material.

As an outer shape of the metal included in the conductive resin layer, a spherical metal powder or a flat metal powder can be used, but a mixture of the spherical metal powder and the flat metal powder is preferably used.

For example, known various thermosetting resins such as an epoxy resin, a phenol resin, a urethane resin, a silicone resin, and a polyimide resin can be used as the resin suitable for the conductive resin layer. Among others, the epoxy resin having excellent heat resistance, moisture resistance, adhesion, and the like is one of the most suitable resins.

Furthermore, the conductive resin layer preferably includes a curing agent together with the thermosetting resin. When the epoxy resin is used as the thermosetting resin that is the base, various known compounds such as phenol-based, amine-based, acid anhydride-based, imidazole-based, active ester-based, and amide-imide-based compounds can be used.

Furthermore, the conductive resin layer may include a single layer or a plurality of layers.

Furthermore, the thickness of the conductive resin layer is preferably in a range greater than or equal to about 10 μm and less than or equal to about 150 μm in the thickest portion, for example.

The case where base electrode layer 32 is the thin film layer will be described below.

When base electrode layer 32 is provided as the thin film layer, the thin film layer defines a layer having an average thickness less than or equal to about 1 μm, for example, due to deposition of the metal particle. The thin film layer is formed by a thin film forming method such as a sputtering method or a vapor deposition method.

Plating layer 34 will be described below.

Plating layer 34 includes a lower plating layer 36 and an upper plating layer 38 disposed on the surface of lower plating layer 36.

Plating layer 34 includes a first plating layer 34a disposed on the surface of first base electrode layer 32a, a second plating layer 34b disposed on the surface of second base electrode layer 32b, a third plating layer 34c disposed on the surface of third base electrode layer 32c, and a fourth plating layer 34d disposed on the surface of fourth base electrode layer 32d.

Lower plating layer 36 includes a first lower plating layer 36a in first external electrode 30a, a second lower plating layer 36b in second external electrode 30b, a third lower plating layer 36c in third external electrode 30c, and a fourth lower plating layer 36d in fourth external electrode 30d.

Upper plating layer 38 includes a first upper plating layer 38a in first external electrode 30a, a second upper plating layer 38b in second external electrode 30b, a third upper plating layer 38c in third external electrode 30c, and a fourth upper plating layer 38d in fourth external electrode 30d.

Lower layer plating layer 36 and upper layer plating layer 38 may have a common configuration, and may contain at least one metal selected from, for example, Cu, Ni, Sn, Ag, Pd, Ag—Pd alloy, and Au. Preferably, lower plating layer 36 defines a Ni plating layer, and upper plating layer 38 defines a Sn plating layer.

The Ni plating layer can prevent base electrode layer 32 from being eroded by solder when three-terminal multilayer ceramic capacitor 100 is mounted on the mounting substrate. In addition, the Sn plating layer improves solder wettability when three-terminal multilayer ceramic capacitor 100 is mounted on the mounting substrate, and three-terminal multilayer ceramic capacitor 100 can be easily mounted.

For each of lower plating layer 36 and upper plating layer 38, the thickness per layer is preferably greater than or equal to about 2 μm and less than or equal to about 15 μm, for example.

External electrode 30 may be formed only with the plating layer without providing base electrode layer 32.

Although not illustrated, a structure in which the plating layer is provided without providing base electrode layer 32 will be described below.

In each of first external electrode 30a and second external electrode 30b, the plating layer may be directly formed on the surface of multilayer body 10 without providing base electrode layer. That is, three-terminal multilayer ceramic capacitor 100 may have a structure including the plating layer electrically connected to first internal electrode layer 21 and second internal electrode layer 22.

In such the structure, the plating layer may be formed after a catalyst is disposed on the surface of multilayer body 10 as a pretreatment.

When the plating layer is directly formed on the multilayer body without providing the base electrode layer, the reduced thickness of base electrode layer can be converted into the low-height, namely, thinned multilayer body, or converted into the thickness of the multilayer body, namely, the thickness of inner layer portion, so that the degree of freedom in designing multilayer body 10 can be improved.

The plating layer preferably includes a lower plating electrode formed on the surface of multilayer body 10 and an upper plating electrode formed on the surface of the lower plating electrode. For example, each of the lower plating electrode and the upper plating electrode preferably includes at least one metal selected from Cu, Ni, Sn, Pb, Au, Ag, Pd, Bi, Zn, or the like, or an alloy including the metal.

Furthermore, the lower plating electrode is preferably formed using Ni having solder barrier performance, and the upper plating electrode is preferably formed using Sn or Au having good solder wettability.

For example, when first internal electrode layer 21 and second internal electrode layer 22 are formed using Ni, the lower plating electrode is preferably formed using Cu having good bondability with Ni. The upper plating electrode may be formed as necessary, and each of first external electrode 30a and second external electrode 30b may include only the lower plating electrode. As the plating layer, the upper plating electrode may be used as the outermost layer, or another plating electrode may be further formed on the surface of the upper plating electrode.

At this point, when external electrode 30 is formed only with the plating layer without providing base electrode layer 32, the thickness per layer of the plating layer disposed without providing base electrode layer 32 is preferably greater than or equal to about 1.0 μm and less than or equal to about 15.0 μm, for example.

Furthermore, the plating layer preferably does not contain glass. The metal ratio per unit volume of the plating layer is preferably greater than or equal to about 99 vol %.

External electrode 30 may include only lower plating layer 36 and the upper plating layer 38 without providing base electrode layer 32. That is, all or portion of first external electrode 30a to fourth external electrode 30d defining external electrode 30 can have a configuration in which lower plating layer 36 and upper plating layer 38 are directly formed on the surface of multilayer body 10 without providing base electrode layer 32. In this case, three-terminal multilayer ceramic capacitor 100 has a structure including lower plating layer 36 directly and electrically connected to first internal electrode layer 21 and second internal electrode layer 22 and upper plating layer 38 disposed on lower plating layer 36.

For example, each of lower plating layer 36 and upper plating layer 38 preferably includes at least one metal selected from Cu, Ni, Sn, Pb, Au, Ag, Pd, Bi, Zn, or the like or an alloy including the metal. Lower plating layer 36 is preferably formed using Ni having solder barrier performance, and upper plating layer 38 is preferably formed using Sn or Au having good solder wettability.

For example, when first internal electrode layer 21 and second internal electrode layer 22 are formed using Ni, lower plating layer 36 is preferably formed using Cu having good bondability with Ni. Upper plating layer 38 may be formed as necessary, and each of first external electrode to fourth external electrode may include only lower plating layer 36.

Furthermore, in external electrode 30, as the present preferred embodiment, upper plating layer 38 may be used as the outermost layer, or another plating electrode may be further formed on the surface of the upper plating layer 38.

The thickness per layer of lower plating layer 36 and upper plating layer 38 that are disposed without providing base electrode layer 32 is preferably greater than or equal to about 1 μm and less than or equal to about 15 μm, for example.

Furthermore, preferably each of lower plating layer 36 and upper plating layer 38 does not contain glass as a composition. The metal ratio per unit volume of each of lower plating layer 36 and upper plating layer 38 is preferably greater than or equal to about 99 vol %, for example.

The dimension in length direction z of three-terminal multilayer ceramic capacitor 100 including multilayer body 10, first external electrode 30a, and second external electrode 30b is defined as an L dimension, the dimension in multilayer direction x of three-terminal multilayer ceramic capacitor 100 including multilayer body 10, first external electrode 30a, and second external electrode 30b is defined as a T dimension, and the dimension in width direction y of three-terminal multilayer ceramic capacitor 100 including multilayer body 10, first external electrode 30a, and second external electrode 30b is defined as a W dimension.

In the dimension of three-terminal multilayer ceramic capacitor 100, the L dimension in length direction z is greater than or equal to about 1.00 mm and less than or equal to about 1.20 mm, the W dimension in width direction y is greater than or equal to about 0.50 mm and less than or equal to about 0.70 mm, and the T dimension in multilayer direction x is greater than or equal to about 0.30 mm and less than or equal to about 0.39 mm, for example. The dimensions of three-terminal multilayer ceramic capacitor 100 can be measured with a microscope.

Figure 21:
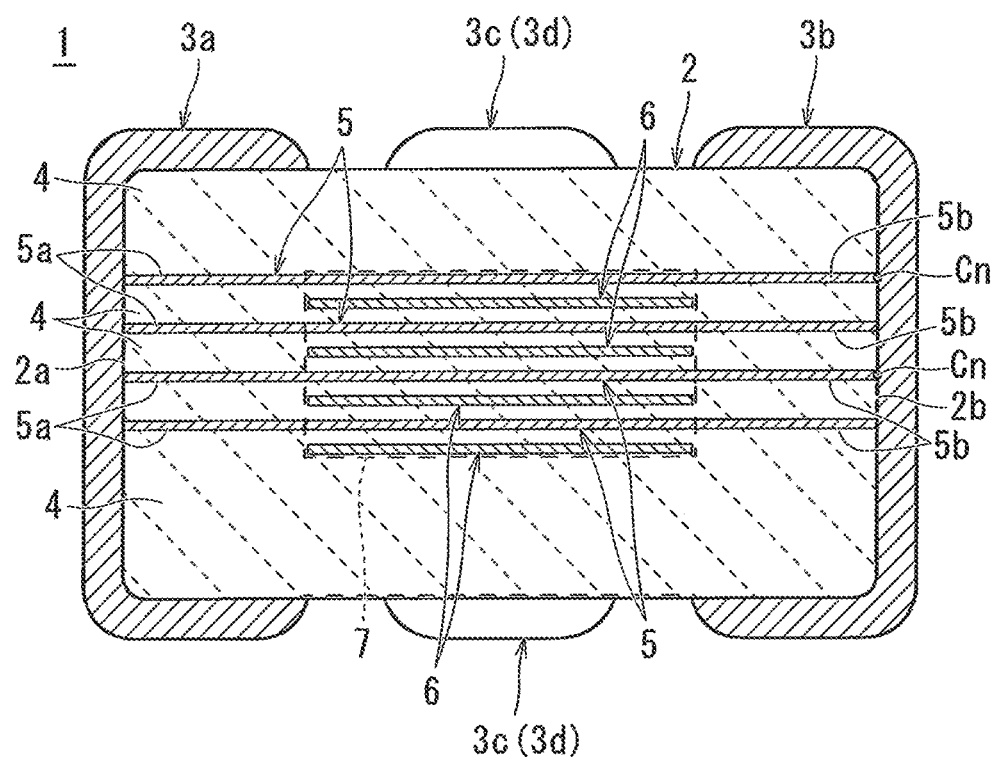
FIG. 21 is a sectional view illustrating a configuration of a conventional three-terminal multilayer ceramic capacitor.

At this point, FIG. 21 illustrates a three-terminal multilayer ceramic capacitor 1 of a conventional example.

The conventional three-terminal multilayer ceramic capacitor includes a multilayer body 2, external electrodes 3a, 3b on both end surfaces of multilayer body 2, and external electrodes 3c, 3d on both side surfaces of multilayer body 2. Then, a plurality of first internal electrode layers 5 exposed on both end surfaces and second internal electrode layers 6 exposed on both side surfaces are alternately laminated and disposed inside multilayer body 2 with dielectric layers 4 interposed therebetween.

A first end surface-side drawn electrode 5a of first internal electrode layer 5 extends straight to a first end surface 2a, and a second end surface-side drawn electrode 5b extends straight to a second end surface 2b.

In this case, the current path from inner layer portion 7 that is the region where first internal electrode layer 5 and second internal electrode layer 6 opposite to each other to the mounting substrate (not illustrated) is a total of the distance from inner layer portion 7 to a connection point cn at which the first end surface-side drawn electrode 5a is connected to external electrode 3a on first end surface 2a, and the distance from connection point cn to a conductor land on the mounting substrate (not illustrated).

Figure 9A:
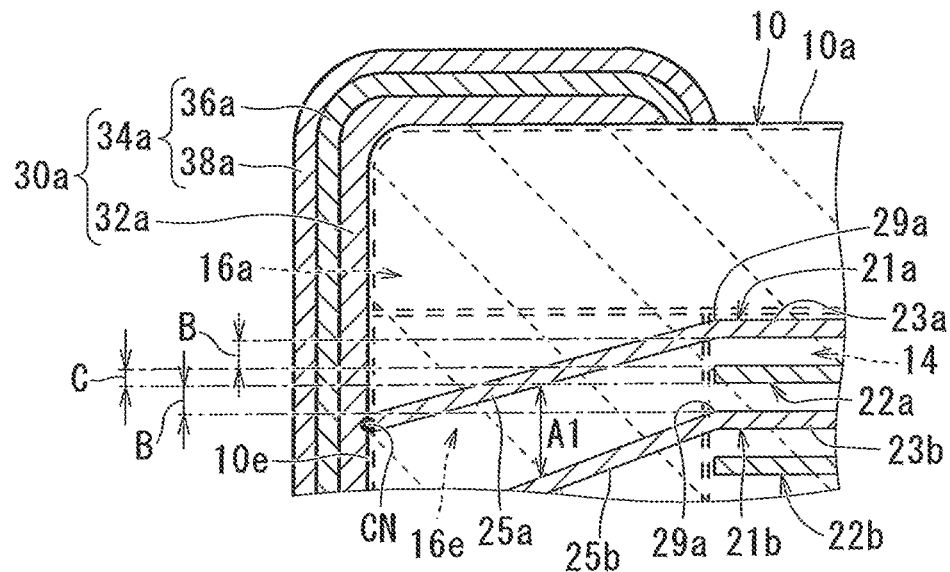
FIG. 9A is an enlarged view illustrating a region R1 in FIG. 4 and is a schematic sectional view illustrating action of the three-terminal multilayer ceramic capacitor according to the first preferred embodiment of the present invention.
Figure 9B:
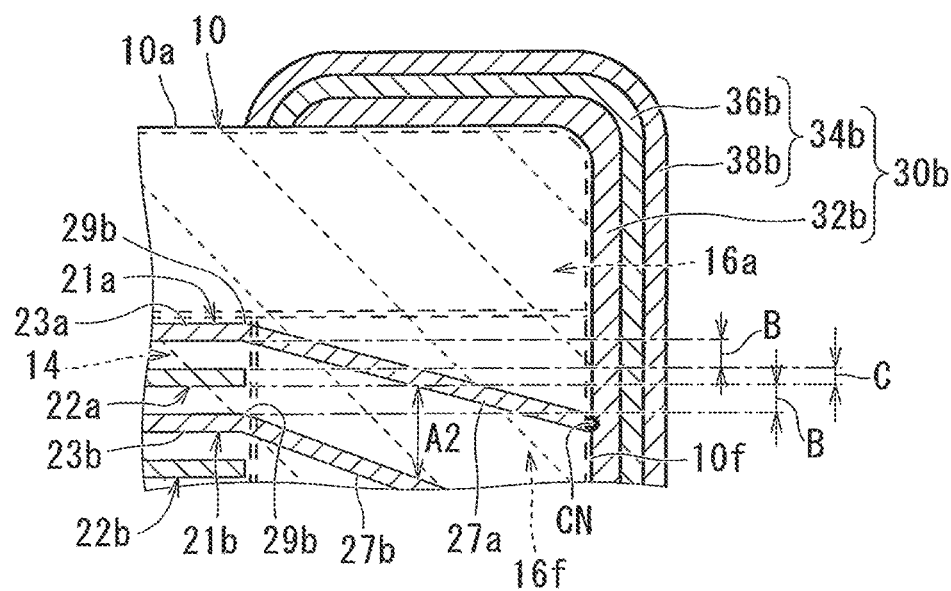
FIG. 9B is an enlarged view illustrating a region R2 in FIG. 4 and is a schematic sectional view illustrating the action of the three-terminal multilayer ceramic capacitor according to the first preferred embodiment of the present invention.

On the other hand, as illustrated in FIG. 9A, in three-terminal multilayer ceramic capacitor 100 of the first preferred embodiment of the present invention, the current path from inner layer portion 14 to the mounting substrate (not illustrated) is the total of the distance from first bent portion 29a to the connection point of first end surface-side drawn electrode portion 25a inclined toward the conductor land on the mounting substrate (not illustrated) with the first external electrode 30a and the distance from a connection point CN to the conductor land on the mounting substrate (not illustrated). Similarly, as illustrated in FIG. 9B, in three-terminal multilayer ceramic capacitor 100 of the first preferred embodiment of the present invention, the current path from inner layer portion 14 to the mounting substrate (not illustrated) is the total of the distance from second bent portion 29b to the connection point of second end surface-side drawn electrode portion 27a inclined toward the conductor land on the mounting substrate (not illustrated) with second external electrode 30b and the distance from connection point CN to the conductor land on the mounting substrate (not illustrated).

Accordingly, the first preferred embodiment of the present invention achieves a shorter current path than the conventional example.

As described above, in three-terminal multilayer ceramic capacitor 100 in FIG. 1, first end surface-side drawn electrode portions 25a to 25d have first bent portion 29a, second end surface-side drawn electrode portions 27a to 27d have second bent portion 29b, a portion or an entirety of the first end surface-side drawn electrode portions 25a to 25d are disposed so as to face one of first principal surface 10a or second principal surface 10b by first bent portion 29a, and a portion or an entirety of second end surface-side drawn electrode portions 27a to 27d are disposed so as to face one of first principal surface 10a or second principal surface 10b by second bent portion 29b, so that the current path from first internal electrode layers 21a to 21d to the mounting substrate can be made shorter than that of the conventional example in first internal electrode layers 21a to 21d.

This makes it possible to improve the low ESL characteristic in three-terminal multilayer ceramic capacitor 100.

As described above, in three-terminal multilayer ceramic capacitor 100 of the present preferred embodiment, in first internal electrode layer 21a, first end surface-side drawn electrode portion 25a includes first bent portion 29a, and second end surface-side drawn electrode portion 27a includes second bent portion 29b.

Then, first end surface-side drawn electrode portion 25a is bent and disposed so as to face second principal surface 10b by first bent portion 29a, and second end surface-side drawn electrode portion 27a is bent and disposed so as to face second principal surface 10b by second bent portion 29b.

Figure 11:
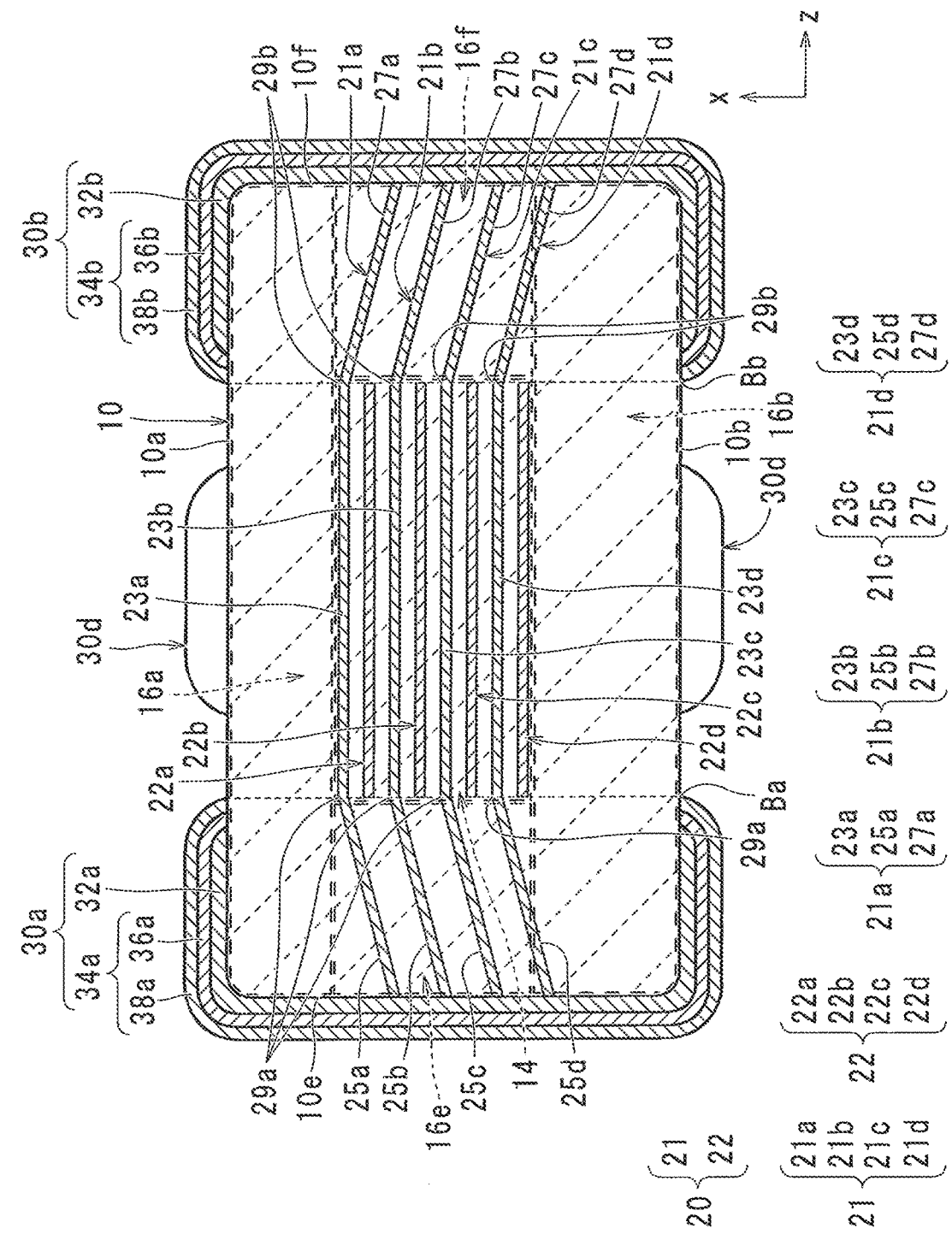
FIG. 11 is a plan view illustrating a configuration of another example of the three-terminal multilayer ceramic capacitor according to the first preferred embodiment of the present invention.

Therefore, as illustrated in FIG. 11, first bent portion 29a and second bent portion 29b may be arranged at the same and equal intervals in first internal electrode layer 21 between first counter electrode portions 23a to 23d and first end surface-side drawn electrode portions 25a to 25d and second end surface-side drawn electrode portions 27a to 27d. In this case, in addition to the desired effect, the intervals between first end surface-side drawn electrode portions 25a to 25d and second end surface-side drawn electrode portions 27a to 27d are uniform, and variations in quality can be prevented to obtain a stable low ESL characteristic.

Figure 12:
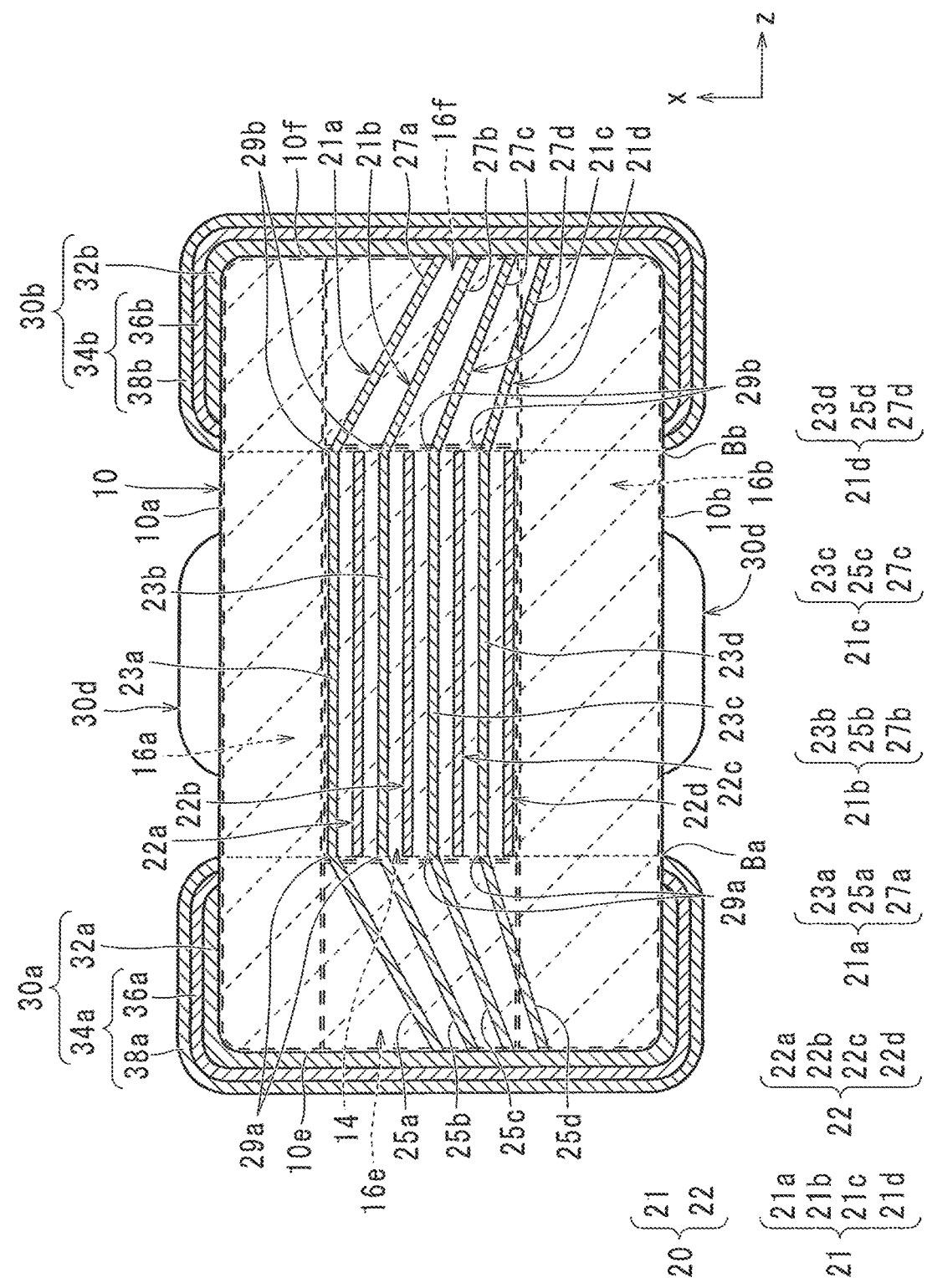
FIG. 12 is a plan view illustrating a configuration of another example of the three-terminal multilayer ceramic capacitor according to the first preferred embodiment of the present invention.

As illustrated in FIG. 12, first bent portion 29a and second bent portion 29b may be configured such that a mutual interval between first end surface-side drawn electrode portions 25a to 25d and second end surface-side drawn electrode portions 27a to 27d is smaller than a mutual interval between first counter electrode portions 23a to 23d in first internal electrode layer 21. In this case, in addition to the desired effect, the connection point between each of first end surface-side drawn electrode portions 25a to 25d and first external electrode 30a and the connection point between each of second end surface-side drawn electrode portions 27a to 27d and first external electrode 30a are disposed at positions closer to the mounting surface, so that the current path between inner layer portion 14 and the mounting surface can be further shortened and the low ESL characteristic can be further improved.

b. Mounting Structure of Three-Terminal Multilayer Ceramic Capacitor

Figure 13:
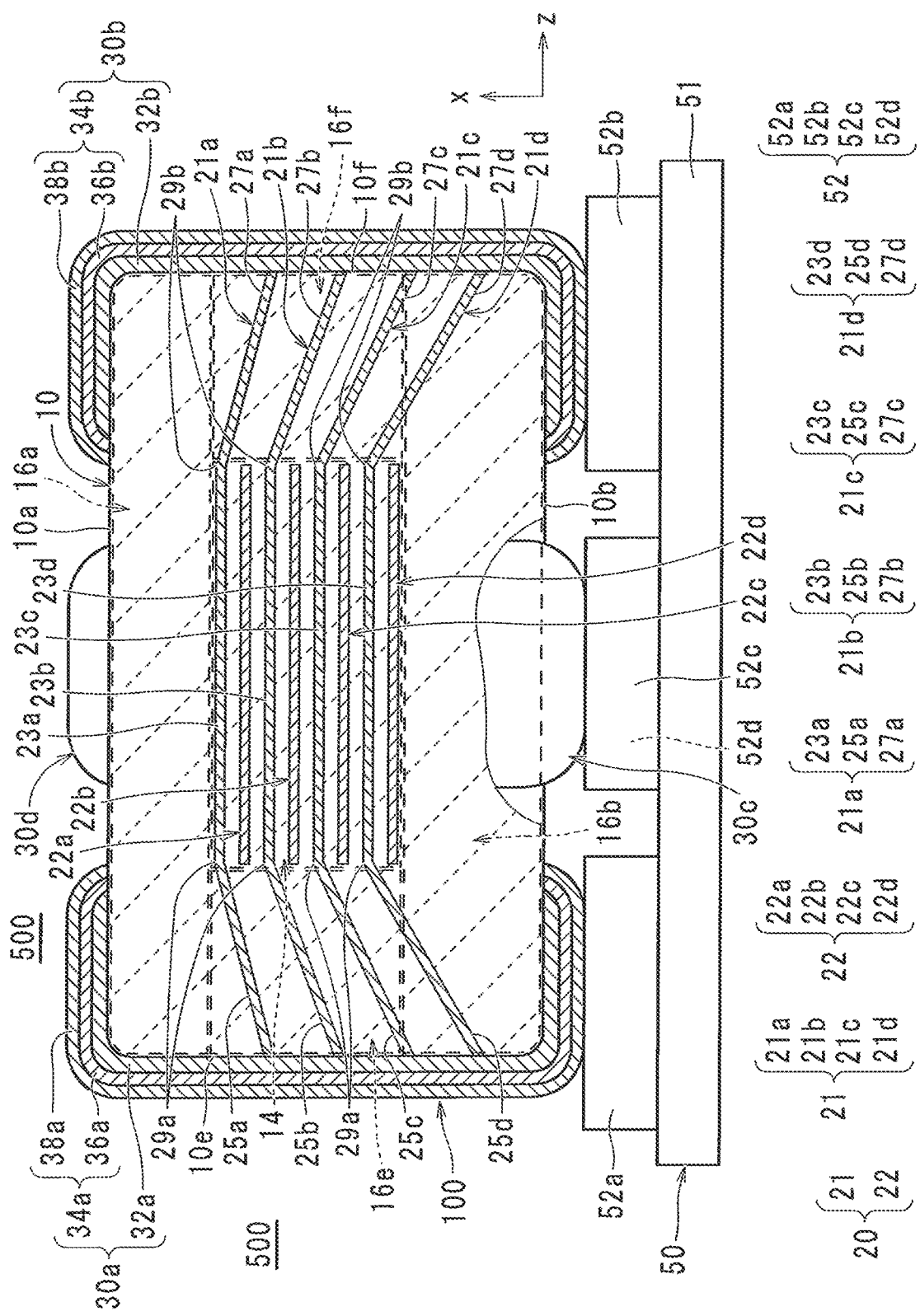
FIG. 13 is a sectional view illustrating an example of a mounting structure of the three-terminal multilayer ceramic capacitor according to the first preferred embodiment of the present invention.
Figure 14:
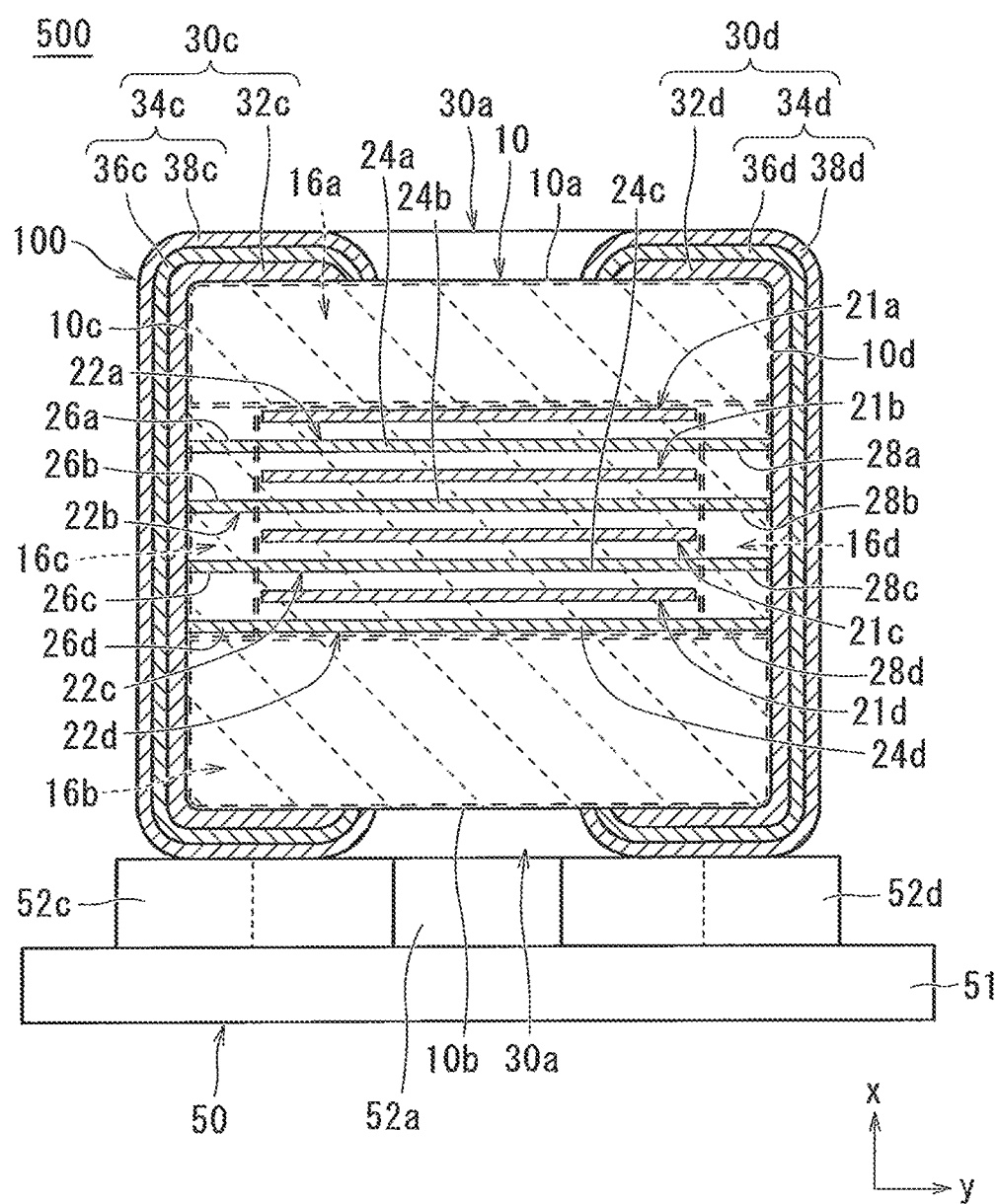
FIG. 14 is a sectional view illustrating an example of the mounting structure of the three-terminal multilayer ceramic capacitor according to the first preferred embodiment of the present invention.

With reference to FIGS. 13 and 14, a mounting structure of the three-terminal multilayer ceramic capacitor according to the first preferred embodiment of the present invention will be described below.

As illustrated in FIGS. 13 and 14, a mounting structure 500 of the three-terminal multilayer ceramic capacitor of the present preferred embodiment includes three-terminal multilayer ceramic capacitor 100 of the first preferred embodiment and a mounting substrate 50. Mounting substrate 50 includes a core material 51 and a conductor land 52 of the substrate. For example, core material 51 of the substrate includes a substrate made of a material in which an epoxy resin or a polyimide resin is impregnated into a base material obtained by mixing a glass cloth (cloth) and a glass nonwoven fabric, or a ceramic substrate manufactured by baking a sheet obtained by mixing a ceramic and glass. Core material 51 of the substrate may be a substrate including a single layer or a substrate formed by laminating a plurality of layers.

The thickness of core material 51 of the base substrate is not particularly limited, but for example, is preferably is greater than or equal to about 200 μm and less than or equal to about 800 μm, for example.

One principal surface of core material 51 of the substrate defines a substrate-side mounting surface 51a on which a conductor land 52 is disposed and which defines and functions as the mounting surface of three-terminal multilayer ceramic capacitor 100.

Conductor land 52 includes a first conductor land 52a, a second conductor land 52b, a third conductor land 52c, and a fourth conductor land 52d.

First conductor land 52a is electrically connected and mechanically joined to first external electrode 30a of three-terminal multilayer ceramic capacitor 100 by a joining material. Second conductor land 52b is electrically connected and mechanically joined to second external electrode 30b of three-terminal multilayer ceramic capacitor 100 by a joining material. Third conductor land 52c is electrically connected and mechanically joined to third external electrode 30c of three-terminal multilayer ceramic capacitor 100 by a joining material. Fourth conductor land 52d is electrically connected and mechanically joined to fourth external electrode 30d of three-terminal multilayer ceramic capacitor 100 by a joining material.

Conductor land 52 may be provided on the principal surface opposite to substrate-side mounting surface 51a of core material 51 of the substrate.

The material of conductor land 52 is not particularly limited, but for example, a metal such as copper, gold, palladium, or platinum can be used. The thickness of conductor land 52, namely, the dimension in multilayer direction x is not particularly limited, but for example, is preferably greater than or equal to about 20 μm and less than or equal to about 200 μm. For example, a high heat resistance epoxy adhesive can be used as the joining material.

In the above description, mounting substrate 50 corresponds to a mounting substrate according to a preferred embodiment of the present invention. Core material 51 of the substrate corresponds to a core material of a substrate according to a preferred embodiment of the present invention. Substrate-side mounting surface 51a corresponds to a mounting surface according to a preferred embodiment of the present invention. The plurality of conductor lands 52 correspond to a plurality of connection conductors according to a preferred embodiment of the present invention. However, the connection conductor according to preferred embodiments of the present invention is not limited by other uses, functions, shapes, names, and the like as long as it is a conductor that is provided between the multilayer ceramic capacitor and the mounting substrate and can electrically connect the multilayer ceramic capacitor and the mounting substrate, in addition to what is called a land.

Mounting structure 500 of the three-terminal multilayer ceramic capacitor in FIGS. 13 and 14 is mounted on mounting substrate 50 such that the second principal surface 10b of three-terminal multilayer ceramic capacitor 100 faces substrate-side mounting surface 51a. Thus, electric connection between three-terminal multilayer ceramic capacitor 100 and mounting substrate 50 is implemented in a state in which the distance between first end surface-side drawn electrode portions 25a to 25d and second end surface-side drawn electrode portions 27a to 27d extended from first end surface 10e and second end surface 10f and substrate-side mounting surface 51a of mounting substrate 50 is reduced or minimized.

Accordingly, in mounting structure 500 of the three-terminal multilayer ceramic capacitor in FIGS. 13 and 14, the current path from first internal electrode layers 21a to 21d of three-terminal multilayer ceramic capacitor 100 to mounting substrate 50 can be made shorter than that of the conventional example by directly reflecting various actions of three-terminal multilayer ceramic capacitor 100 according to the first preferred embodiment of the present invention. As a result, the low ESL characteristic in the mounting structure of 100 three-terminal multilayer ceramic capacitor is improved by reflecting various effects of three-terminal multilayer ceramic capacitor 100 according to the first preferred embodiment of the present invention.

In the above description, second principal surface 10b of three-terminal multilayer ceramic capacitor 100 is mounted on mounting substrate 50 so as to face substrate-side mounting surface 51a. However, when the respective ends of the first end surface-side drawn electrode portions 25a to 25d and second end surface-side drawn electrode portions 27a to 27d extended from first end surface 10e and second end surface 10f are located closer to first principal surface 10a, namely, when the respective ends are bent toward first end surface-side drawn electrode portions 25a to 25d and second end surface-side drawn electrode portions 27a to 27d toward first principal surface 10a by first bent portion 29a and second bent portion 29b of first internal electrode layer 21, first principal surface 10a of three-terminal multilayer ceramic capacitor 100 is mounted on mounting substrate 50 so as to face substrate-side mounting surface 51a. Thus, the same configuration as when second principal surface 10b is opposed to substrate-side mounting surface 51a is implemented, and various effects reflecting various effects of three-terminal multilayer ceramic capacitor 100 in FIG. 1 are exhibited.

c. Method for Manufacturing Three-Terminal Multilayer Ceramic Capacitor

Subsequently, a non-limiting example of a method for manufacturing three-terminal multilayer ceramic capacitor 100 of the first preferred embodiment of the present invention will be described as a method for manufacturing the multilayer ceramic capacitor of the first preferred embodiment.

Preparation

First, a dielectric sheet for the dielectric layer, a conductive paste for the internal electrode layer, and a dielectric paste for the dielectric layer are prepared. As the dielectric sheet, a dielectric sheet on which the first internal electrode layer is disposed, a dielectric sheet on which the second internal electrode layer is disposed, and a dielectric sheet on which the internal electrode layer is not disposed are prepared. Each of the dielectric sheet, the conductive paste, and the dielectric paste includes a binder and a solvent. The binder and the solvent may be known ones.

Production of Multilayer Sheet

Subsequently, the conductive paste is printed on the dielectric sheet in a predetermined pattern corresponding to each shape of the internal electrode layer by, for example, a method such as screen printing, gravure printing, or printing using an inkjet printer. Thus, the conductive paste is applied to a portion that becomes the first internal electrode layer on the dielectric sheet (hereinafter, the dielectric sheet is referred to as a first already-applied dielectric sheet). In addition, the conductive paste is applied to a portion that becomes the second internal electrode layer on the dielectric sheet (hereinafter, the dielectric sheet is referred to as a second already-applied dielectric sheet).

Specifically, when the conductive paste for the internal electrode layer is applied by the screen printing, a screen plate for printing the first internal electrode layer and a screen plate for printing the second internal electrode layer are separately prepared, and a printing machine capable of printing these two types of screen plates on different dielectric sheets can be used to print a predetermined pattern corresponding to each of the internal electrode layers.

Subsequently, the dielectric paste for the dielectric layer is applied to the portion of the second already-applied dielectric sheet to which the conductive paste for the internal electrode layer is not applied at a position that becomes the first end surface-side outer layer portion and the second end surface-side outer layer portion of the multilayer body by, for example, the method such as the screen printing, the gravure printing, or the printing using the inkjet printer. Specifically, referring to the second internal electrode layer in FIG. 7 and the layout of the dielectric layer in which the second internal electrode layer is disposed, the dielectric paste for the dielectric layer is applied to an application region ARa on the first end surface side from the end side on the first end surface side of the second counter electrode portion in the second already-applied dielectric sheet. Similarly, the dielectric paste for the dielectric layer is applied to an application region ARb on the second end surface side from the end side on the second end surface side of the second counter electrode portion in the second already-applied dielectric sheet.

Thus, the thickness of the application region ARa on the first end surface side from a place corresponding to a boundary Ba matched with the end side on the first end surface side of the second counter electrode portion and the thickness of the application region ARb on the second end surface side from a place corresponding to a boundary Bb matched with the end side on the second end surface side of the second counter electrode portion can be made larger in the second applied dielectric sheet.

Subsequently, a predetermined number of dielectric sheets for outer layers on which the pattern of the internal electrode layer is not printed is laminated to form the portion that becomes the second principal surface-side outer layer on the second principal surface side. Then, the first already-applied dielectric sheet on which the pattern of the first internal electrode layer is printed and the second already-applied dielectric sheet on which the pattern of the second internal electrode layer is printed are sequentially laminated on the portion that becomes the second principal surface-side outer layer portion so as to become the structure of the present invention, thus forming the portion including the inner layer portion. The portion that becomes the first principal surface-side outer layer portion on the first principal surface side is formed on the portion including the inner layer portion by laminating the predetermined number of dielectric sheets for the outer layers on which the pattern of the internal electrode layer is not printed.

When the first already-applied dielectric sheet is laminated on the second already-applied dielectric sheet during forming the portion including the inner layer portion, portions on both end surface sides of the first already-applied dielectric sheet are bent in multilayer direction x along boundaries Ba, Bb located on both end surface sides of the portion that becomes the second counter electrode portion of the second already-applied dielectric sheet. Thus, a structure corresponding to the first bent portion and the second bent portion is formed in the first internal electrode layer of the multilayer body.

At this point, by adopting a configuration in which the dielectric paste is applied to all the second already-applied dielectric sheets of the multilayer body, the thickness of the portion to which the dielectric paste is applied is larger than the thickness of the portion to which the dielectric paste is not applied, and gradually increases according to the number of multilayer sheets. As a result, in the first end surface-side outer layer portion and the second end surface-side outer layer portion of the completed multilayer body as illustrated in FIGS. 9A and 9B, when C is the thickness of the first internal electrode layer or the second internal electrode layer, B is the thickness B of the dielectric layer in the inner layer portion, A1 is the thickness of the dielectric layer formed by the dielectric paste, namely, the thickness of the dielectric layer sandwiched between the pair of first end surface-side drawn electrode portions adjacent along multilayer direction x, and A2 is the thickness of the dielectric layer sandwiched between the pair of second end surface-side drawn electrode portions adjacent along multilayer direction x, a relationship of $A1 > 2 \times B + C$ and $A2 > 2 \times B + C$ between the thicknesses A1, A2, B, and C can be satisfied.

Thus, the multilayer sheet is produced.

Production of Multilayer Block

Subsequently, the multilayer sheet is pressed in the multilayer direction of the dielectric sheets by isostatic pressing or other method to produce a multilayer block.

Production of Multilayer Chip

A plurality of multilayer chips are cut out by cutting the multilayer block into a predetermined size. At this point, the corner portion and the ridge portion of the multilayer chip may be rounded by barrel polishing or the like.

Production of Multilayer Body

Multilayer body 10 is produced by baking the multilayer chip. The baking temperature depends on the material of dielectric sheet or the material of the internal electrode layer, and is preferably greater than or equal to about 900° C. and less than or equal to about 1400° C., for example.

Formation of External Electrode

Case of Baked Layer

In the following description, the base electrode layer defines the baked layer. When the baked layer is formed, the conductive paste including a glass component and a metal is applied, and then baking processing is performed to form the baked layer. The temperature of the baking processing at this time is preferably greater than or equal to about 700° C. and less than or equal to about 900° C., for example.

Third base electrode layer 31c of third external electrode 30c and fourth base electrode layer 32d of fourth external electrode 30d are formed on first side surface 10c and second side surface 10d of multilayer body 10. At this point, various methods can be used as the method for forming the baked layer. For example, a method in which the conductive paste is extruded from a slit and applied (what is called a dip method) can be used. In this method, the base electrode layer can be formed not only on first side surface 10c and second side surface 10d but also on a portion of first principal surface 10a and a portion of second principal surface 10b by increasing the extrusion amount of the conductive paste.

The baked layer can also be formed using a roller transfer method. In the case of the roller transfer method, the base electrode layer can be formed not only on first side surface 10c and second side surface 10d but also on a portion of first principal surface 10a and a portion of second principal surface 10b by increasing the pressing pressure during roller transfer.

Subsequently, first base electrode layer 32a of first external electrode 30a and second base electrode layer 32b of second external electrode 30b are formed on first end surface 10e and second end surface 10f of multilayer body 10.

In the present preferred embodiment, each of first base electrode layer 32a and second base electrode layer 32b is formed so as to extend not only to first end surface 10e and second end surface 10f but also to a portion of first principal surface 10a, a portion of second principal surface 10b, a portion of first side surface 10c, and a portion of second side surface 10d by using the dip method.

The order of the baking processing is not limited to the above. Third base electrode layer 32c of third external electrode 30c, fourth base electrode layer 32d of fourth external electrode 30d, first base electrode layer 32a of first external electrode 30a, and second base electrode layer 32b of second external electrode 30b may be simultaneously baked, or baked on the side surface side and the end surface side.

Case of Conductive Resin Layer

When first base electrode layer 32a to fourth base electrode layer 32d include the conductive resin layer, the following method can be used. The conductive resin layer may be formed on the surface of the baked layer, or the conductive resin layer may be directly formed alone on multilayer body 10 without forming the baked layer.

The conductive resin paste including a thermosetting resin and a metal component is applied onto the baked layer or multilayer body 10, and heat treatment is performed at a temperature greater than or equal to about 250° C. and less than or equal to about 550° C. to thermally cure the resin, thereby forming the conductive resin layer. An atmosphere during the heat treatment at this time is preferably an $N_2$ atmosphere. In addition, in order to prevent scattering of the resin and to prevent oxidation of various metal components, an oxygen concentration is preferably inhibited to less than or equal to about 100 ppm.

As the method for applying the conductive resin paste, similar to the method for forming the base electrode layer as the baked layer, the conductive resin paste can be formed by, for example, a method in which the conductive resin paste is extruded from the slit and applied or the roller transfer method.

Case of Thin Film Layer

When first base electrode layer 32a to fourth base electrode layer 32d are formed as thin film layers, a structure other than a desired portion where external electrode 30 is to be formed is covered with masking or the like, and the exposed desired portion is subjected to a thin film forming method such as a sputtering method or a vapor deposition method. The third base electrode layer 32c including the thin film layer is a layer having a thickness of less than or equal to about 1 μm on which metal particles are deposited.

Production of Plating Layer

Finally, first lower plating layer 36a to fourth lower plating layer 36d and first upper plating layer 38a to fourth upper plating layer 38d are formed. The plating layer may be formed on the surface of third base electrode layer 32c, or directly formed on multilayer body 10. In the present preferred embodiment, the plating layer is formed on the surfaces of first base electrode layer 32a to fourth base electrode layer 32d. More specifically, Ni plating layers are formed as first lower plating layer 36a to fourth lower plating layer 36d on first base electrode layer 32a to fourth base electrode layer 32d, and Sn plating layers are formed as first upper plating layer 38a to fourth upper plating layer 38d on the surfaces thereof the Ni plating layers. Either electrolytic plating or electroless plating may be adopted in performing the plating processing. However, the electroless plating requires preprocessing using a catalyst or the like in order to improve a plating deposition rate, and has a disadvantage that the process becomes complicated. Accordingly, it is usually preferable to adopt the electrolytic plating.

As described above, the three-terminal multilayer ceramic capacitor of the first preferred embodiment is obtained.

B. Second Preferred Embodiment a. Three-Terminal Multilayer Ceramic Capacitor

Subsequently, a three-terminal multilayer ceramic capacitor according to a second preferred embodiment of the present invention will be described.

Figure 15:
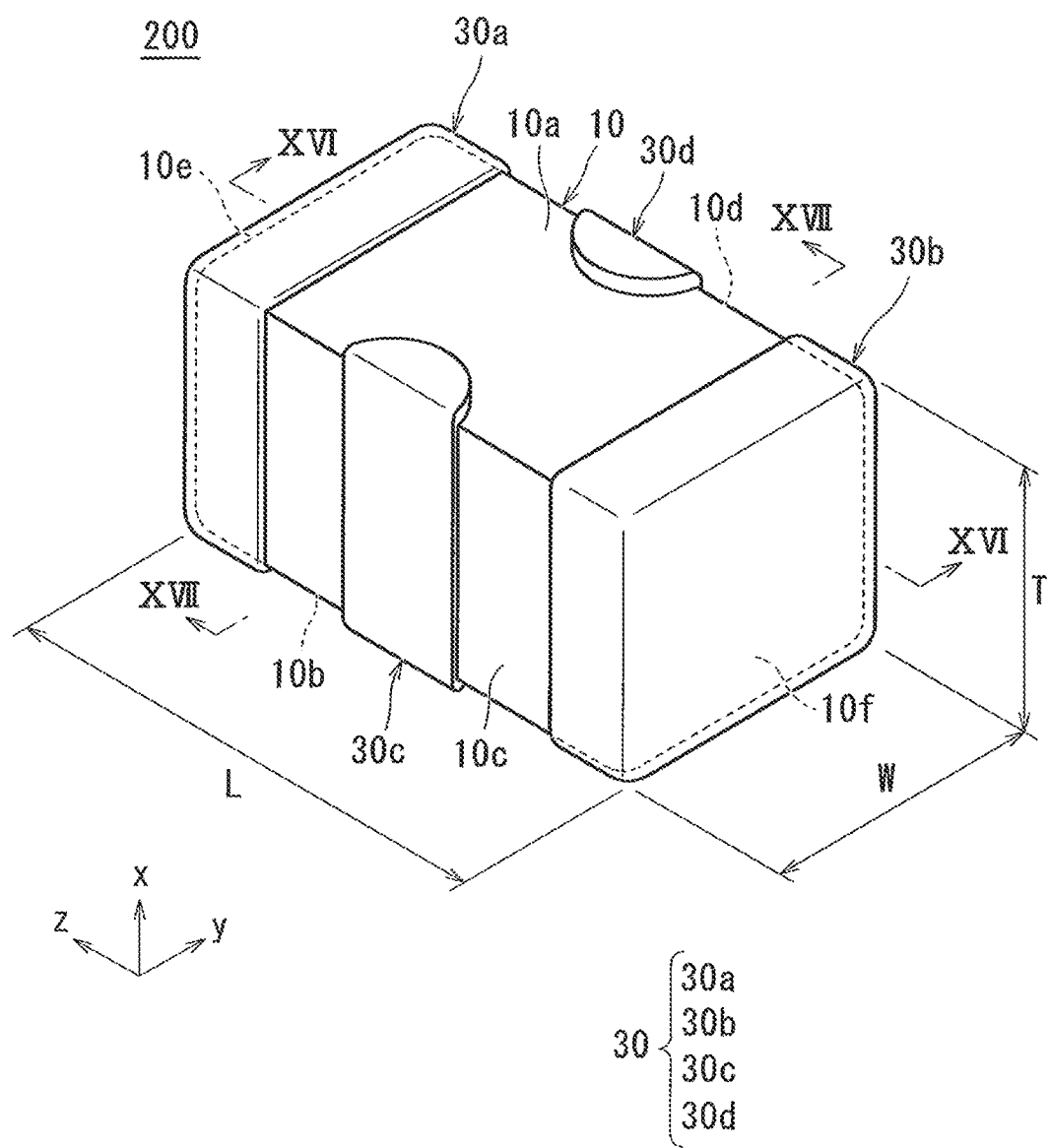
FIG. 15 is an external perspective view illustrating an example of a three-terminal multilayer ceramic capacitor according to a second preferred embodiment of the present invention.
Figure 16:
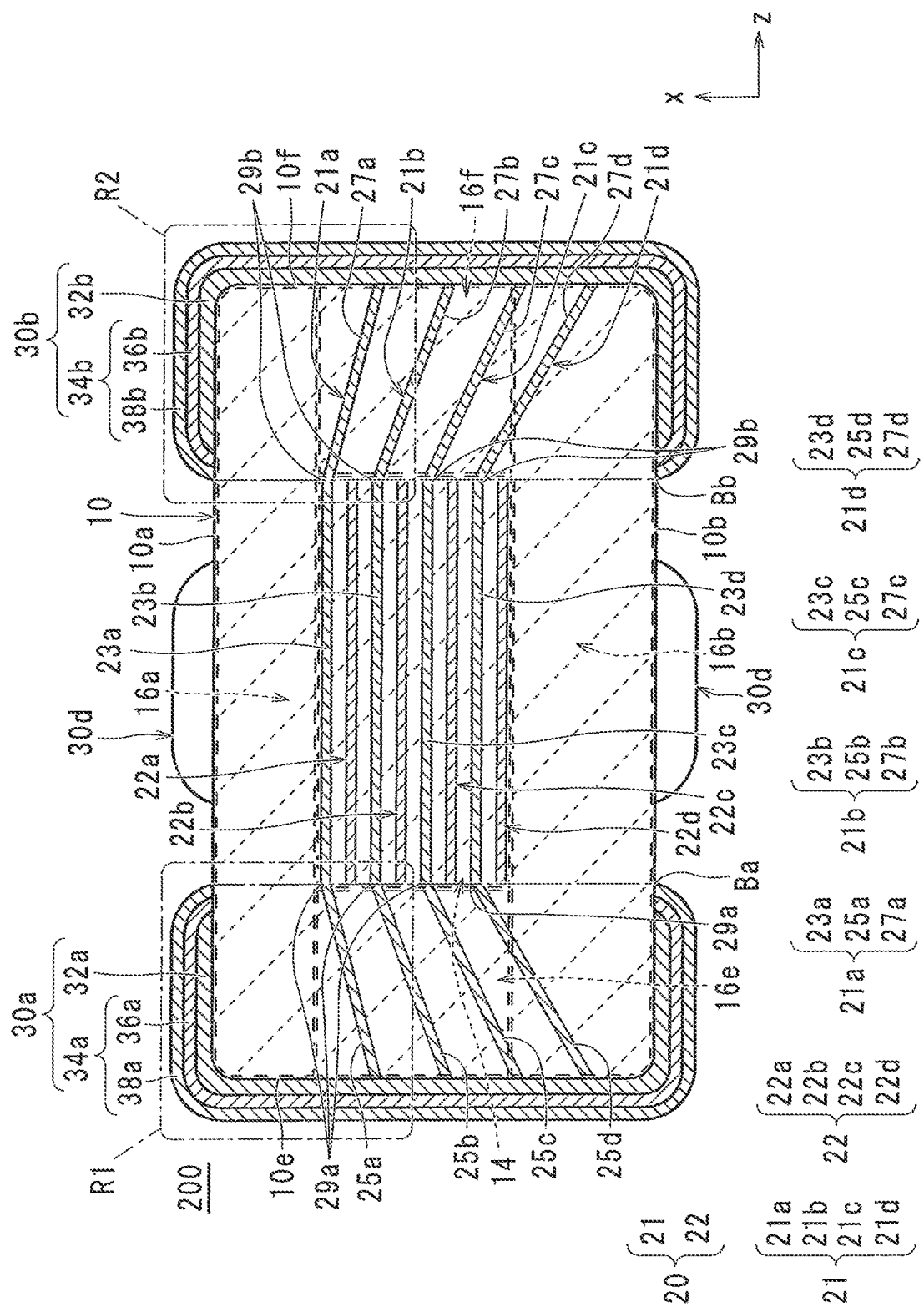
FIG. 16 is a sectional view taken along a line XVI-XVI in FIG. 15.
Figure 17:
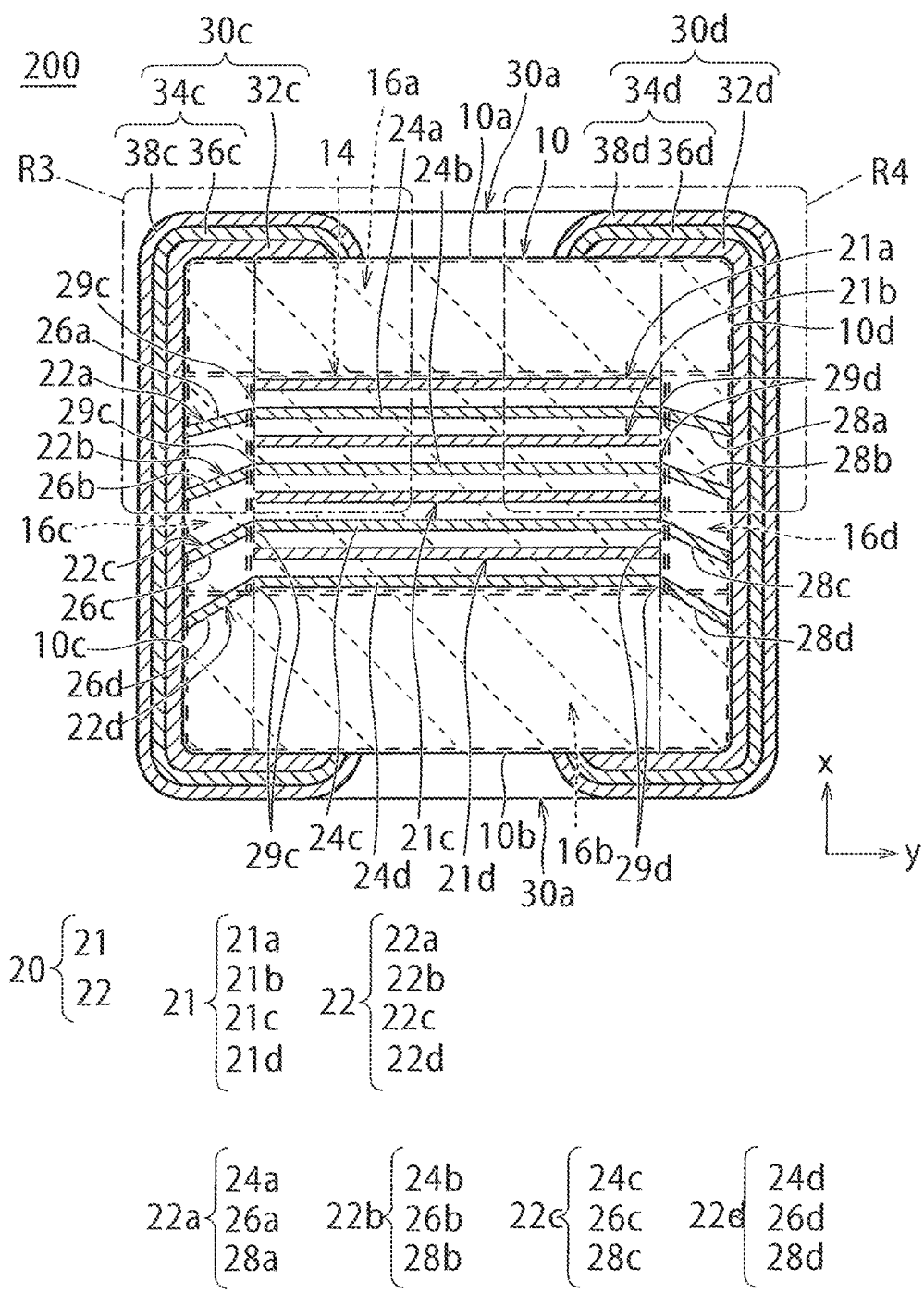
FIG. 17 is a sectional view taken along a line XVII-XVII in FIG. 15.
Figure 18:
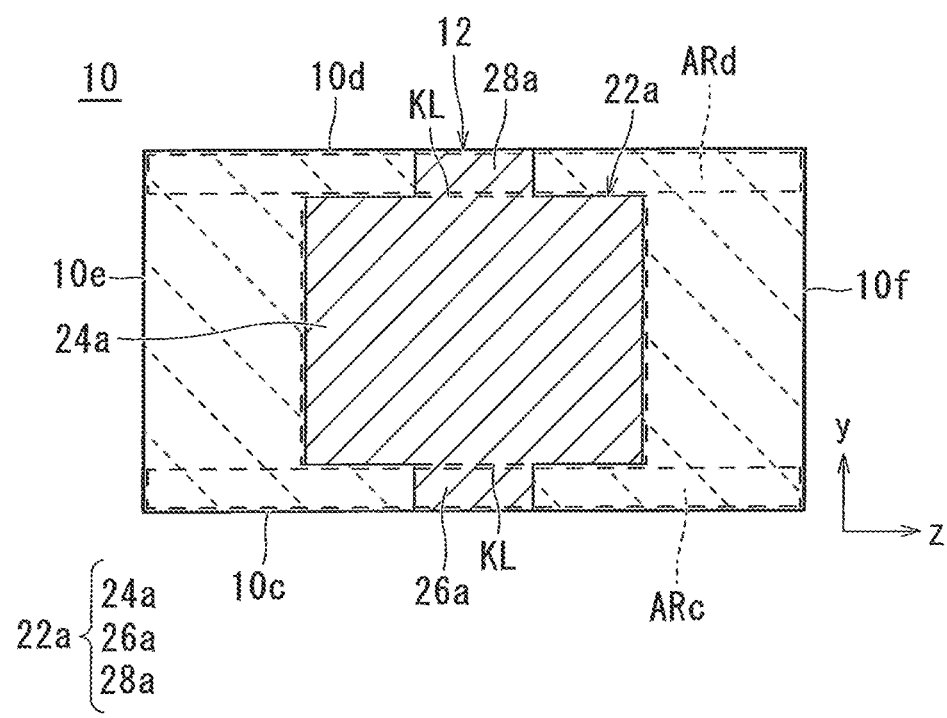
FIG. 18 is a plan view illustrating a configuration of a second internal electrode layer of the three-terminal multilayer ceramic capacitor according to the second preferred embodiment of the present invention.

FIG. 15 is an external perspective view illustrating an example of a three-terminal multilayer ceramic capacitor according to a second preferred embodiment of the present invention. FIG. 16 is a sectional view taken along a line XVI-XVI in FIG. 15. FIG. 17 is a sectional view taken along a line XVII-XVII in FIG. 15. FIG. 18 is a plan view illustrating a configuration of a second internal electrode layer of the three-terminal multilayer ceramic capacitor according to the second preferred embodiment of the present invention, and corresponds to a plan view in the same direction as that in FIG. 7. However, the same reference numerals are given to the same or corresponding configurations as those of the first preferred embodiment, and detailed description of the same configurations and operations as those of the first preferred embodiment will be omitted.

A three-terminal multilayer ceramic capacitor 200 of the present preferred embodiment is characterized in that second internal electrode layers 22 have a different configuration than that in three-terminal multilayer ceramic capacitor 100 of the first preferred embodiment. That is, as illustrated in FIGS. 16 and 17, taking second internal electrode layer 22a as an example, three-terminal multilayer ceramic capacitor 200 includes a second counter electrode portion 24a opposite to first internal electrode layer 21, a first side surface-side drawn electrode portion 26a extended from the second counter electrode portion 24a to the surface of first side surface 10c of multilayer body 10, and a second side surface-side drawn electrode portion 28a extended from second counter electrode portion 24a to the surface of second side surface 10d of multilayer body 10.

Furthermore, in second internal electrode layer 22a, first side surface-side drawn electrode portion 26a includes a third bent portion 29c, and second side surface-side drawn electrode portion 28a includes a fourth bent portion 29d.

Figure 19A:
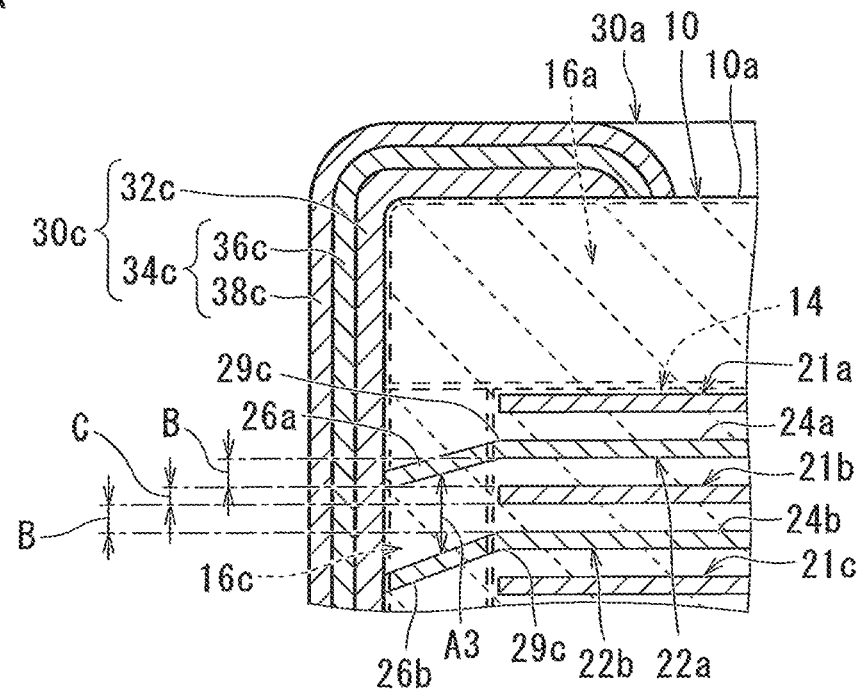
FIG. 19A is an enlarged view illustrating a region R3 in FIG. 17 and is a schematic sectional view illustrating another function of the three-terminal multilayer ceramic capacitor according to the second preferred embodiment of the present invention.
Figure 19B:
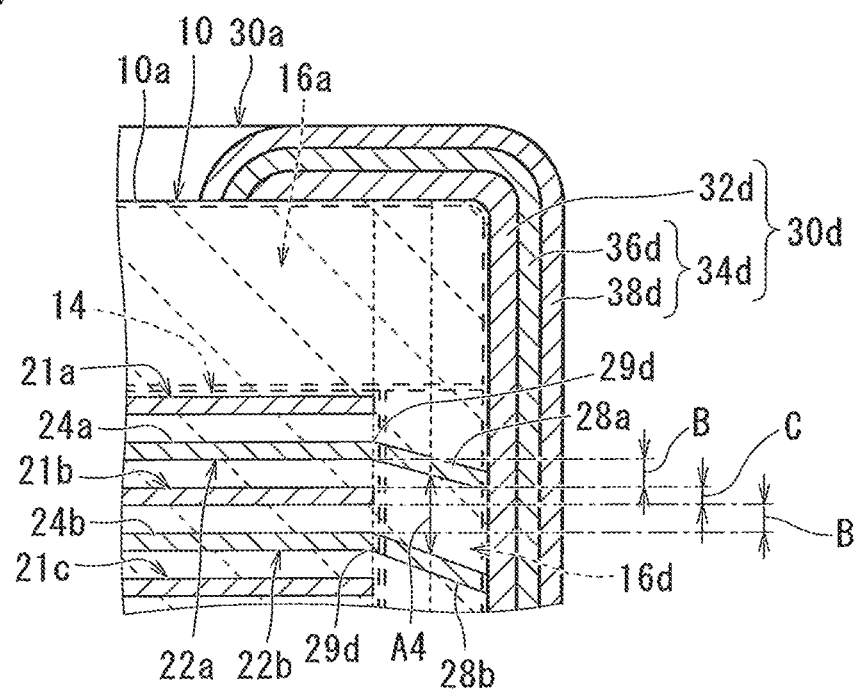
FIG. 19B is an enlarged view illustrating a region R4 in FIG. 17 and is a schematic sectional view illustrating another function of the three-terminal multilayer ceramic capacitor according to the second preferred embodiment of the present invention.

At this point, with appropriate reference to a main portion enlarged view illustrated in a region R3 and a region R4, third bent portion 29c and fourth bent portion 29d in FIG. 17 in FIGS. 19A and 19B will be described.

By third bent portion 29c, first side surface-side drawn electrode portion 26a is bent and disposed so as to face second principal surface 10b.

By fourth bent portion 29d, second side surface-side drawn electrode portion 28a is bent and disposed so as to face second principal surface 10b.

First side surface-side drawn electrode portion 26a may be bent and disposed so as to face first principal surface 10a by third bent portion 29c, and the second side surface-side drawn electrode portion 28a may be bent and disposed so as to face first principal surface 10a by fourth bent portion 29d.

Accordingly, when three-terminal multilayer ceramic capacitor 200 is mounted on the mounting substrate, in multilayer body 10, first side surface-side drawn electrode portion 26a of second internal electrode layer 22a is bent by third bent portion 29c toward the mounting surface of the mounting substrate on which three-terminal multilayer ceramic capacitor 200 is mounted, the mounting surface of the mounting substrate facing downward along multilayer direction x with respect to the plane perpendicular or substantially perpendicular to multilayer direction x.

Thus, connection point CN between the end of first side surface-side drawn electrode portion 26a and third external electrode 30c is shifted downward from third bent portion 29c in multilayer direction x. The same applies to the other electrode layers located in first side surface-side outer layer portion 16c, and all of first side surface-side drawn electrode portions 26b to 26d connecting second counter electrode portions 24b to 24d of second internal electrode layers 22b to 22d and first side surface 10c are bent toward the mounting surface of the mounting substrate on which three-terminal multilayer ceramic capacitor 100 is mounted by including third bent portion 29c.

When three-terminal multilayer ceramic capacitor 200 is mounted on the mounting substrate, in multilayer body 10, second side surface-side drawn electrode portion 28a of second internal electrode layer 22a is bent by fourth bent portion 29d toward the mounting surface of the mounting substrate on which three-terminal multilayer ceramic capacitor 200 is mounted, the mounting surface of the mounting substrate facing downward along multilayer direction x with respect to the plane perpendicular or substantially perpendicular to multilayer direction x.

Thus, connection point CN between the end of second side surface-side drawn electrode portion 28a and fourth external electrode 30d is shifted downward from fourth bent portion 29d in multilayer direction x. The same applies to the other electrode layers located in the second side surface-side outer layer portion 16d, and all of second side surface-side drawn electrode portions 28b to 28d connecting second counter electrode portions 24b to 24d of second internal electrode layers 22b to 22d and second side surface 10d are all bent toward the mounting surface of the mounting substrate on which three-terminal multilayer ceramic capacitor 200 is mounted by including fourth bent portion 29d.

Thus, the total length of first side surface-side drawn electrode portion 26a and second side surface-side drawn electrode portion 28a inclined toward the mounting surface side of the mounting substrate of the capacitor is increased or maximized, the first side surface-side drawn electrode portion 26a and second side surface-side drawn electrode portion 28a being formed by third bent portion 29c and fourth bent portion 29d, and the current path from second internal electrode layers 22a to 22d to the mounting substrate is formed at the shortest distance, so that the low ESL characteristic in three-terminal multilayer ceramic capacitor 200 can be improved.

Furthermore, third bent portion 29c of each of second internal electrode layers 22a to 22d is located closer to the side of inner layer portion 14 than the position of ½ of the dimension in length direction z between first side surface 10c and the outermost surface of inner layer portion 14 on the side of first side surface 10c.

In addition, fourth bent portion 29d of each of second internal electrode layers 22a to 22d is located closer to the side of inner layer portion 14 than the position of ½ of the dimension in length direction z between second side surface 10d and the outermost surface of inner layer portion 14 on the side of second side surface 10d.

Thus, first side surface-side drawn electrode portions 26a to 26d and second side surface-side drawn electrode portions 28a to 28d are bent at an early stage, and these drawn electrode portions are drawn to the position closer to the mounting surface of the mounting substrate, so that the above-described effect according to the preferred embodiments of the present invention is easily exhibited.

Furthermore, in multilayer body 10, the following relationship is satisfied between the pair of adjacent second internal electrode layers 22, first internal electrode layers 21 located between second internal electrode layers 22, and dielectric layers 12 located between first internal electrode layers 21 and second internal electrode layers 22.

That is, when A3 is the thickness of dielectric layer 12 located between second internal electrode layers 22 adjacent in multilayer direction x located at the position of ½ of the dimension in width direction y between the first side surface 10c and the outermost surface of inner layer portion 14 on the side of first side surface 10c, when A4 is the thickness of the dielectric layer 12 located between first internal electrode layers 21 adjacent in multilayer direction x located at the position of ½ of the dimension in width direction y between second side surface 10d and the outermost surface of inner layer portion 14 on the side of second side surface 10d, and when B is the thickness of dielectric layer 12 located between first internal electrode layer 21 and second internal electrode layer 22 adjacent in multilayer direction x located at the central portion of inner layer portion 14, and when C is the thicknesses of first internal electrode layers 21 or second internal electrode layers 22 adjacent to each other in multilayer direction x located at the central portion of inner layer portion 14, a relationship of $A3 > 2 \times B + C$ and $A4 > 2 \times B + C$ is satisfied.

Thus, in multilayer body 10, first side surface-side drawn electrode portions 26a to 26d arranged in first side surface-side outer layer portion 16c and second side surface-side drawn electrode portions 28a to 28d arranged in second side surface-side outer layer portion 16d can be inclined from inner layer portion 14 toward the mounting surface of the mounting substrate with a large bending angle, and the above-described effect achieved by preferred embodiments of the present invention can be more easily obtained.

Method for Measuring A3

When A3 is the thickness of dielectric layer 12 positioned between second internal electrode layers 22 adjacent in multilayer direction x positioned at the position of ½ of the dimension in width direction y of first side surface-side outer layer portion 16c, A3 is measured by the following method.

That is, first, the section of three-terminal multilayer ceramic capacitor 200 is exposed. Specifically, the polishing is performed until reaching position of ½L of three-terminal multilayer ceramic capacitor 200, and the polishing is performed so as to be parallel or substantially parallel to first end surface 10e or second end surface 10f to expose a WT section. Subsequently, the thickness of dielectric layer 12 positioned between second internal electrode layer 22 adjacent in multilayer direction x positioned at the position of ½ of the dimension in length direction z of first side surface-side outer layer portion 16c in the polished section is measured using the scanning electron microscope (SEM). At this time, the thicknesses of a total of 10 dielectric layers 12 from a side of first principal surface 10a or a side of second principal surface 10b of dielectric layers 12 located between adjacent second internal electrode layers 22 of first side surface-side outer layer portion 16c are measured, and the average value thereof is taken as the dimension A3 of one three-terminal multilayer ceramic capacitor 200.

Method for Measuring A4

When A4 is the thickness of dielectric layer 12 positioned between second internal electrode layers 22 adjacent in multilayer direction x positioned at the position of ½ of the dimension in width direction y of second side surface-side outer layer portion 16d, A4 is measured by the following method.

That is, first, the section of three-terminal multilayer ceramic capacitor 200 is exposed. Specifically, the polishing is performed until reaching position of ½L of three-terminal multilayer ceramic capacitor 200, and the polishing is performed so as to be parallel or substantially parallel to first end surface 10e or second end surface 10f to expose a WT section. Subsequently, the thickness of dielectric layer 12 positioned between second internal electrode layer 22 adjacent in the multilayer direction positioned at the position of ½ of the dimension in the length direction of first side surface-side outer layer portion 16c in the polished section is measured using the scanning electron microscope (SEM). At this time, the total of 10 dielectric layers 12 from a side of first principal surface 10a or a side of second principal surface 10b of dielectric layers 12 located between adjacent second internal electrode layers 22 of second side surface-side outer layer portion 16d are measured, and the average value thereof is taken as the dimension A4 of one three-terminal multilayer ceramic capacitor 200.

Although the description has been given assuming that first bent portion 29a and second bent portion 29b included in each of first internal electrode layers 21 are all bent in the same direction, the bent portion according to a preferred embodiment of the present invention may have a configuration in which some electrode layers of first internal electrode layer 21 are bent in different directions.

In the above description, first bent portion 29a and second bent portion 29b have been described as having the single bending point. However, the bending point according to preferred embodiments of the present invention may include a plurality of bending points.

Furthermore, in the above description, the angles of first bent portion 29a and second bent portion 29b may increase or decrease as approaching any one of first principal surface 10a and second principal surface 10b when viewed in the section (LT section) parallel to first side surface 10c or second side surface 10d.

While the conditions of thicknesses A3, B, and C are satisfied, when viewed in the section (WT section) parallel or substantially parallel to first end surface 10e or second end surface 10f, the angle of the plurality of third bent portions 29c included in multilayer body 10 may be changed so as to be larger or smaller in third bent portion 29c located on the side closer to second principal surface 10b.

Thus, in multilayer body 10, first side surface-side drawn electrode portions 26a to 26d arranged in first side surface-side outer layer portion 16c are arranged so as to radially extend from inner layer portion 14, and the mutual interval therebetween is larger than the mutual interval of second counter electrode portions 24a to 24d arranged in inner layer portion 14.

While the conditions of thicknesses A4, B, and C are satisfied, when viewed in the section (WT section) parallel or substantially parallel to first end surface 10e or second end surface 10f, the angle of the plurality of fourth bent portions 29d included in multilayer body 10 may be changed so as to be larger or smaller in second bent portion 29b located on the side closer to second principal surface 10b.

Thus, in multilayer body 10, second side surface-side drawn electrode portions 28a to 28d arranged in second side surface-side outer layer portion 16d are arranged so as to radially extend from inner layer portion 14, and the mutual interval therebetween is larger than the mutual interval of second counter electrode portions 24a to 24d arranged in inner layer portion 14.

The angle defined by third bent portion 29c between second counter electrode portions 24a to 24d and first side surface-side drawn electrode portions 26a to 26d is preferably greater than or equal to about 0.1° and less than or equal to about 40.0°, for example.

The angle defined by fourth bent portion 29d between second counter electrode portions 24a to 24d and second side surface-side drawn electrode portions 28a to 28d is preferably greater than or equal to about 0.1° and less than or equal to about 40.0°, for example.

As illustrated in FIG. 18, third bent portion 29c appears as a pair of ridge portions KL defined by second counter electrode portion 24a and first side surface-side drawn electrode portion 26a intersecting each other when viewed in multilayer direction x.

In addition, as illustrated in FIG. 18, fourth bent portion 29d appears as the pair of ridge portions KL defined by second counter electrode portion 24a and second side surface-side drawn electrode portion 28a intersecting with each other when viewed in multilayer direction x.

Three-terminal multilayer ceramic capacitor 200 of the second preferred embodiment of the present invention has the above configuration, so that the same various effects based on the same action as three-terminal multilayer ceramic capacitor 100 of the first preferred embodiment are achieved in addition to the effect of three-terminal multilayer ceramic capacitor 100 of the first preferred embodiment.

That is, in three-terminal multilayer ceramic capacitor 200 of the second preferred embodiment of the present invention, the current path from second internal electrode layers 22a to 22d to the mounting substrate can be made shorter than that in the conventional example by structuring third bent portion 29c and fourth bent portion 29d to incline first side surface-side drawn electrode portions 26a to 26d and second side surface-side drawn electrode portions 28a to 28d toward the mounting surface side of the mounting substrate of three-terminal multilayer ceramic capacitor 200. This makes it possible to further improve the low ESL characteristics in the three-terminal multilayer ceramic capacitor 200.

Various modifications of first bent portion 29a and second bent portion 29b of three-terminal multilayer ceramic capacitor 100 described in the first preferred embodiment are also applied to three-terminal multilayer ceramic capacitor 200 of the second preferred embodiment, and the same effects as those of the modifications are obtained.

b. Mounting Structure of Three-Terminal Multilayer Ceramic Capacitor

Figure 20:
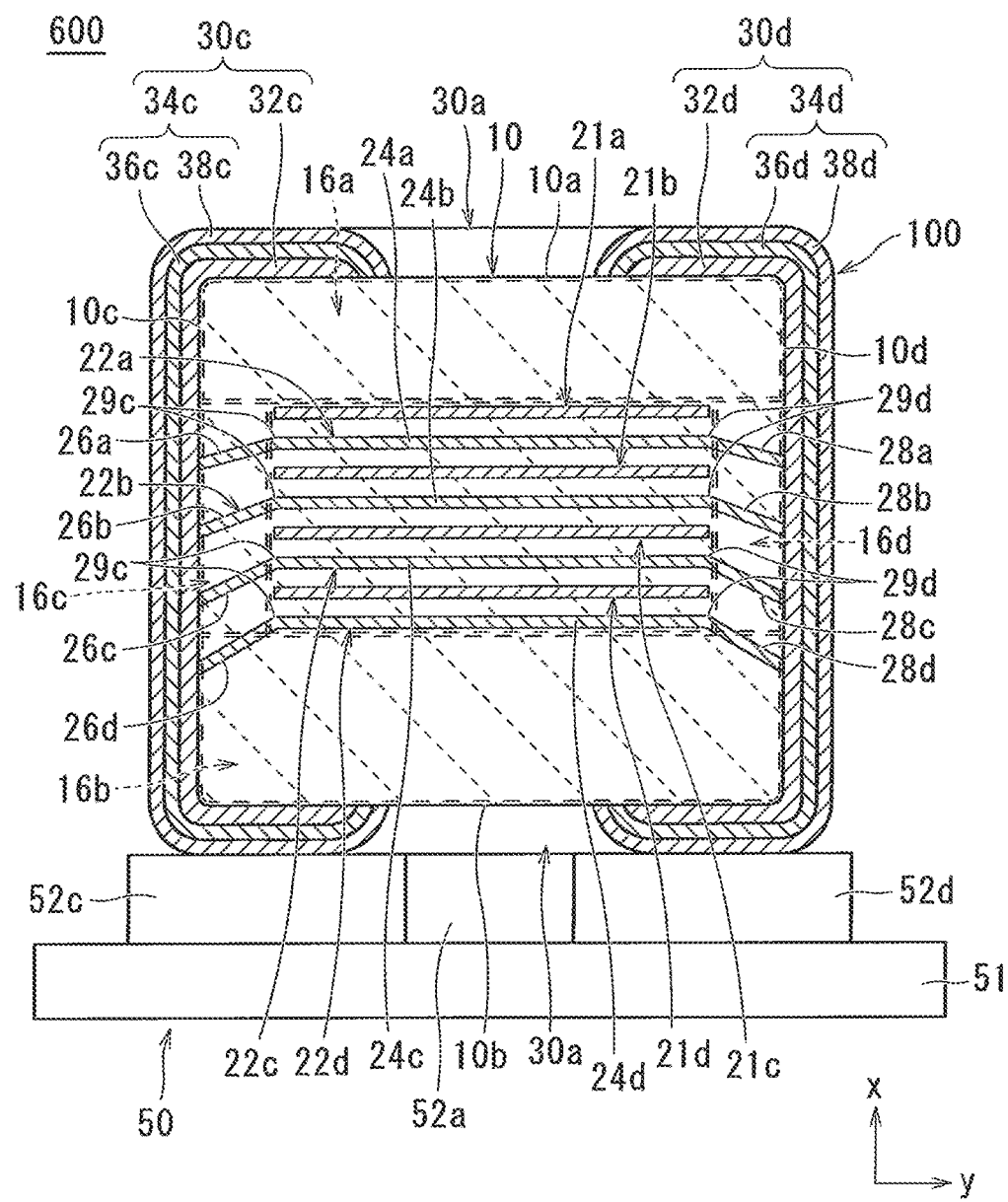
FIG. 20 is a sectional view illustrating an example of a mounting structure of the three-terminal multilayer ceramic capacitor according to the second preferred embodiment of the present invention.

With reference to FIG. 20, a mounting structure of the three-terminal multilayer ceramic capacitor according to the second preferred embodiment of the present invention will be described below. However, components that are the same as or correspond to those in FIG. 14 are denoted by the same reference numerals, and detailed description of components and operations common to those of the second preferred embodiment with reference to FIG. 14 will be omitted.

As illustrated in FIG. 20, a mounting structure 600 of the three-terminal multilayer ceramic capacitor includes three-terminal multilayer ceramic capacitor 200 of the second preferred embodiment and mounting substrate 50.

Mounting structure 600 of three-terminal multilayer ceramic capacitor according to the second preferred embodiment of the present invention having the above configuration is mounted on mounting substrate 50 such that second principal surface 10b of three-terminal multilayer ceramic capacitor 200 faces substrate-side mounting surface 51a. Thus, the electrical connection between three-terminal multilayer ceramic capacitor 200 and mounting substrate 50 is implemented in a state in which the distances between first side surface-side drawn electrode portions 26a to 26d and second side surface-side drawn electrode portions 28a to 28d extended from first side surface 10c and second side surface 10d and substrate-side mounting surface 51a of mounting substrate 50 are reduced or minimized.

Thus, mounting structure 600 of the three-terminal multilayer ceramic capacitor according to the first preferred embodiment of the present invention directly reflects various functions of three-terminal multilayer ceramic capacitor 200 according to the second preferred embodiment of the present invention described above. That is, the current path from first internal electrode layers 21a to 21d and second internal electrode layers 22a to 22d of three-terminal multilayer ceramic capacitor 200 to mounting substrate 50 can be made shorter than that of the conventional example.

Accordingly, the effect of improving the low ESL characteristic in the mounting structure of the three-terminal multilayer ceramic capacitor is obtained by reflecting various effects of three-terminal multilayer ceramic capacitor 200 according to the second preferred embodiment of the present invention.

In the above description, second principal surface 10b of three-terminal multilayer ceramic capacitor 200 is mounted on mounting substrate 50 so as to face substrate-side mounting surface 51a. However, when the respective ends of first side surface-side drawn electrode portions 26a to 26d and second side surface-side drawn electrode portions 28a to 28d extended from first side surface 10c and second side surface 10d are located closer to first principal surface 10a, namely, when third bent portion 29c and fourth bent portion 29d of second internal electrode layer 22 are bent toward first principal surface 10a, first principal surface 10a of three-terminal multilayer ceramic capacitor 200 is mounted on mounting substrate 50 so as to face substrate-side mounting surface 51a. Thus, the same configuration as when first principal surface 10a faces substrate-side mounting surface 51a is implemented, and various effects reflecting various effects of three-terminal multilayer ceramic capacitor 200 according to the second preferred embodiment of the present invention are exhibited.

c. Method for Manufacturing Three-Terminal Multilayer Ceramic Capacitor

Subsequently, a non-limiting example of a method for manufacturing the three-terminal multilayer ceramic capacitor according to the second preferred embodiment will be described. However, the difference between the method for manufacturing the three-terminal multilayer ceramic capacitor of the present preferred embodiment and the method for manufacturing the three-terminal multilayer ceramic capacitor of the first preferred embodiment is a portion of the process of manufacturing the multilayer sheet, and detailed description of the remaining process of manufacturing the multilayer sheet and the process of manufacturing other parts common to the method for manufacturing the multilayer ceramic capacitor of the first preferred embodiment will be omitted.

The process of producing the multilayer sheet in the method for manufacturing the three-terminal multilayer ceramic capacitor of the second preferred embodiment is as follows.

In the present preferred embodiment, the dielectric paste for the dielectric layer is applied to a portion of the first already-applied dielectric sheet to which the conductive paste for the internal electrode layer is not applied by a method such as screen printing, gravure printing, or printing using the inkjet printer, at the position that becomes the first side surface-side outer layer portion and the second side surface-side outer layer portion of the multilayer body. Specifically, referring to the first internal electrode layer and the layout of the dielectric layer in which the first internal electrode layer is disposed in FIG. 18, the dielectric paste for the dielectric layer is applied to an application region ARc on the first side surface side from the end side on the first side surface side of the first counter electrode portion in the first already-applied dielectric sheet. Similarly, the dielectric paste for the dielectric layer is applied to an application region ARd on the second side surface side from the end side on the second side surface side of the first counter electrode portion in the first already-applied dielectric sheet.

Thus, in the first already-applied dielectric sheet, the thickness of application region ARc on the first side surface side from the place corresponding to boundary Bc matched with the end side on the first side surface side of the first counter electrode portion and the thickness of application region ARd on the second side surface side from the place corresponding to boundary Bd matched with the end side on the second side surface side of the first counter electrode portion can be made thicker.

Subsequently, a predetermined number of dielectric sheets for outer layers on which the pattern of the internal electrode layer is not printed is laminated to form the portion that becomes the second principal surface-side outer layer on the second principal surface side. Then, the first already-applied dielectric sheet on which the pattern of the first internal electrode layer is printed and the second already-applied dielectric sheet on which the pattern of the second internal electrode layer is printed are sequentially laminated on the portion that becomes the second principal surface-side outer layer portion so as to become the structure of a preferred embodiment of the present invention, thus forming the portion including the inner layer portion. The portion that becomes the first principal surface-side outer layer portion on the first principal surface side is formed on the portion including the inner layer portion by laminating the predetermined number of dielectric sheets for the outer layers on which the pattern of the internal electrode layer is not printed.

When the first already-applied dielectric sheet is laminated on the second already-applied dielectric sheet in forming the portion including the inner layer portion, both end portions of the first already-applied dielectric sheet are bent in multilayer direction x along boundaries Ba, Bb located on both end surface sides of the portion that becomes the second counter electrode portion of the second already-applied dielectric sheet. Thus, a structure corresponding to the first bent portion and the second bent portion is formed in the first internal electrode layer of the multilayer body.

Furthermore, when the first already-applied dielectric sheet is laminated on the second already-applied dielectric sheet in forming the portion including the inner layer portion, the portions on both side surfaces of the second already-applied dielectric sheet are bent in multilayer direction x along boundaries Bc, Bd located on both side surfaces of the portion that becomes the first counter electrode portion of the first already-applied dielectric sheet. Thus, the structures corresponding to the third bent portion and the fourth bent portion are formed in the second internal electrode layer of the multilayer body.

At this point, by adopting a configuration in which the dielectric paste is applied to all the second already-applied dielectric sheets of the multilayer body, the thickness of the portion to which the dielectric paste is applied is larger than the thickness of the portion to which the dielectric paste is not applied, and gradually increases according to the number of multilayer sheets. As a result, in the first end surface-side outer layer portion and the second end surface-side outer layer portion of the completed multilayer body as illustrated in FIGS. 9A and 9B, when C is the thickness of the first internal electrode layer or the second internal electrode layer, B is the thickness of the dielectric layer in the inner layer portion, and A1 is the thickness of the dielectric layer formed by the dielectric paste, namely, the thickness of the dielectric layer sandwiched between the pair of first end surface-side drawn electrode portions adjacent along multilayer direction x, and A2 is the thickness of the dielectric layer sandwiched between the pair of second end surface-side drawn electrode portions adjacent along multilayer direction x, a relationship of $A1>2\times B+C$ and $A2>2\times B+C$ can be satisfied between the thicknesses A1, A2, B, and C.

In addition, by adopting the configuration in which the dielectric paste is applied to all the first already-applied dielectric sheets of the multilayer body, the thickness of the portion to which the dielectric paste is applied is larger than the thickness of the portion to which the dielectric paste is not applied, and gradually increases according to the number of multilayer sheets. As a result, in the first side surface-side outer layer portion and the second side surface-side outer layer portion of the completed multilayer body as illustrated in FIGS. 19A and 19B, when C is the thickness of the first internal electrode layer or the second internal electrode layer, B is the thickness of the dielectric layer in the inner layer portion, and A3 is the thickness of the dielectric layer formed by the dielectric paste, namely, the thickness of the dielectric layer sandwiched between the pair of first side surface-side drawn electrode portions adjacent along multilayer direction x, and A4 is the thickness of the dielectric layer sandwiched between the pair of second side surface-side drawn electrode portions adjacent along multilayer direction x, the relationship of $A3>2\times B+C$ and $A4>2\times B+C$ between the thicknesses A1, A2, B, and C can be satisfied.

As described above, the three-terminal multilayer ceramic capacitor of the second preferred embodiment is obtained.

D. Experimental Example 1

According to the above manufacturing method, the three-terminal multilayer ceramic capacitor in FIG. 1 was produced as follows, and the ESL was measured.

(a) Specification of Sample of Experimental Example 1

The three-terminal multilayer ceramic capacitor having the following specifications was prepared as an experimental example 1. The specifications of the prepared sample were as follows.

Dimension of three-terminal multilayer ceramic capacitor (design value): L×W×T=1.136 mm×0.632 mm×0.361 mm Material of main component of dielectric layer: $BaTiO_3$ Capacitance: 7.29 µF Rated voltage: 4V Layer thickness (thickness B) of dielectric layer: See Table 1

Electrode material of first internal electrode layer: Ni

Number of first internal electrode layers: 117 sheets

Thickness (thickness C) of first internal electrode layer: 0.56 µm

The first bent portion and the second bent portion bent toward the mounting substrate side as viewed in width direction y were formed in the first end surface-side drawn electrode portion (117 in total) and the second end surface-side drawn electrode portion (117 in total).

In the sample of sample number 1, when A1 is the thickness of the dielectric layer located between the first end surface and the first internal electrode layer adjacent in multilayer direction x located at a position of ½ of the dimension in the length direction z between the first end surface and the outermost surface of the inner layer portion on the first end surface side, A2 is the thickness of the dielectric layer located between the second end surface and the first internal electrode layer adjacent in multilayer direction x located at a position of ½ of the dimension in the length direction z between the second end surface and the outermost surface of the inner layer portion on the second end surface side, B is the thickness of the dielectric layer located between the first internal electrode layer and the second internal electrode layer 22 adjacent in multilayer direction x located at the central portion of the inner layer portion, and C is the thicknesses of the first internal electrode layers or the second internal electrode layers adjacent to each other in multilayer direction x located at the central portion of the inner layer portion, the relationship of $A1>2\times B+C$ and $A2>2\times B+C$ is satisfied.

The resource of sample number 2 had a relationship of $A1 \approx 2 \times B + C$ and $A2 \approx 2 \times B + C$ with respect to thicknesses A1, A2, B, and C.

The resource of sample number 3 had a relationship of $A1 < 2 \times B + C$ and $A2 < 2 \times B + C$ with respect to thicknesses A1, A2, B, and C.

(b) Method for Measuring Thicknesses A1, A2, B and C

The thicknesses of A, B, and C were measured as follows.

Method for Measuring A1

Thickness A1 of the dielectric layer located between the first internal electrode layer adjacent in the multilayer direction located at the position of ½ of the length direction dimension of the first end surface-side outer layer portion was measured by the following method.

That is, first, a cross section of a three-terminal multilayer ceramic capacitor as a sample was exposed. Specifically, polishing was performed until reaching the position of ½ W of the three-terminal multilayer ceramic capacitor, and polishing was performed so as to be parallel or substantially parallel to the side surface, thereby exposing the LT cross section. Next, the thickness of the dielectric layer positioned between the first internal electrode layer adjacent in the multilayer direction positioned at a position of ½ of the length direction dimension of the first end surface-side outer layer portion in the polished cross section was measured using a scanning electron microscope (SEM). At this time, the thicknesses of a total of 10 dielectric layers from a first principal surface side or a second principal surface side of the dielectric layers located between the first internal electrode layers adjacent to each other in the first end surface-side outer layer portion were measured, and averaged to obtain the dimension A1 of one three-terminal multilayer ceramic capacitor.

Method for Measuring A2

Thickness A2 of the dielectric layer located between the second end surface-side outer layer and the first internal electrode layer adjacent in the multilayer direction located at the position of ½ of the length direction dimension of the second end surface-side outer layer was measured by the following method.

That is, first, a cross section of a three-terminal multilayer ceramic capacitor as a sample was exposed. Specifically, polishing was performed until reaching the position of ½ W of the three-terminal multilayer ceramic capacitor, and polishing was performed so as to be parallel or substantially parallel to the side surface, thereby exposing the LT cross section. Subsequently, the thickness of the dielectric layer positioned between the first internal electrode layers adjacent in the multilayer direction positioned at the position of ½ of the length direction dimension of the second end surface-side outer layer portion in the polished section was measured using the scanning electron microscope (SEM). At this point, the thicknesses of the total of 10 dielectric layers from a first principal surface side or a second principal surface side of the dielectric layers located between the first internal electrode layers adjacent to each other of the second end surface-side outer layer portion are measured, and the average value thereof is taken as the dimension of A2 of one three-terminal multilayer ceramic capacitor.

Method for Measuring B

Thickness B of the dielectric layer located between the first internal electrode layer and the second internal electrode layer adjacent in the multilayer direction located at the central portion of the inner layer portion was measured by the following method.

That is, first, a cross section of a three-terminal multilayer ceramic capacitor as a sample was exposed. Specifically, polishing was performed until reaching the position of ½ W of the three-terminal multilayer ceramic capacitor, and polishing was performed so as to be parallel or substantially parallel to the side surface, thereby exposing the LT cross section. Subsequently, the thickness of the dielectric layer located between the first internal electrode layer and the second internal electrode layer adjacent in the multilayer direction at the central portion of the inner layer portion in the polished section was measured using the scanning electron microscope (SEM). At this time, the thicknesses of the total of 10 dielectric layers located between the first internal electrode layer and the second internal electrode layer adjacent in the multilayer direction located at the central portion of the inner layer portion were measured, and the average value thereof was taken as the dimension of B of one three-terminal multilayer ceramic capacitor.

Method for Measuring C

Thickness C of the first internal electrode layer or the second internal electrode layer adjacent to each other in the multilayer direction located at the central portion of the inner layer portion was measured by the following method.

That is, first, the section of the three-terminal multilayer ceramic capacitor was exposed. Specifically, polishing was performed until reaching the position of ½ W of the three-terminal multilayer ceramic capacitor, and polishing was performed so as to be parallel or substantially parallel to the side surface, thereby exposing the LT cross section. Subsequently, at the central portion of the inner layer portion in the polished section, the thickness of the first internal electrode layer or the second internal electrode layer adjacent in the multilayer direction was measured using the scanning electron microscope (SEM). At this time, the thicknesses of the total of 10 internal electrode layers adjacent to each other of the first internal electrode layer or the second internal electrode layer were measured, and the average value thereof was taken as the dimension of C of one three-terminal multilayer ceramic capacitor.

(c) Method for Measuring ESL

The sample of each sample number of experimental example 1 was mounted on the mounting substrate including the mounting surface to produce the sample of the circuit board. Voltage was applied to each external electrode through the land of the circuit board, and the ESL value was measured. Specifically, the voltage was applied to each external electrode, and the ESL value of each sample at a frequency of 100 MHz was measured using a network analyzer (Company name: Agilent Technologies, model number: E5071B). The number of samples of each sample number was 5. Then, the ESL value of the sample of each sample number was calculated as an average value of five samples. The criteria for determining passed products were set less than or equal to 110 pH.

(d) Result

Table 1 illustrates the ESL measurement results for the samples of sample numbers 1 to 3.

TABLE 1

| Sample number | Presence of bent portion in first internal electrode layer | Thickness A1 (μm) | Thickness A2 (μm) | Thickness B (μm) | Thickness C (μm) | 2 × B + C (μm) | Relationship between A1, A2 and 2 × B + C | ESL (pH) |
|---|---|---|---|---|---|---|---|---|
| 1 | Present | 1.97 | 1.94 | 0.59 | 0.56 | 1.74 | A1 > 2 × B + C<br>A2 > 2 × B + C | 109 |
| 2 | Present | 1.76 | 1.72 | 0.58 | 0.57 | 1.73 | A1 ≈ 2 × B + C<br>A2 ≈ 3 × B + C | 113 |
| 3 | Present | 1.61 | 1.59 | 0.59 | 0.56 | 1.74 | A1 < 2 × B + C<br>A2 < 4 × B + C | 115 |

From the results in Table 1, in the sample of sample number 1, A1 is the thickness of the dielectric layer located between the first end surface and the first internal electrode layer adjacent in multilayer direction x located at the position of ½ of the dimension in length direction z between the first end surface and the outermost surface of the inner layer portion on the first end surface side, A2 is the thickness of the dielectric layer located between the second end surface and the first internal electrode layer adjacent in multilayer direction x located at the position of ½ of the dimension in length direction z between the second end surface and the outermost surface of the inner layer portion on the second end surface side, B is the thickness of the dielectric layer located between the first internal electrode layer and the second internal electrode layer adjacent in multilayer direction x located at the central portion of the inner layer portion, and C is the thicknesses of the first internal electrode layers or the second internal electrode layers adjacent to each other in multilayer direction x located in the central portion of the inner layer portion, the sample of sample number 1 had conditions of A1>2×B+C and A2>2×B+C, so that the best ESL was obtained among the samples of sample numbers 1 to 3.

In addition, it was checked from the ESR results of the samples of sample numbers 1 to 3 that the relationship between "A1 and A2" and "2×B+C" may affect the ESL of the multilayer ceramic capacitor when the bent portion is provided in the end surface-side drawn electrode portion in any of sample numbers 1 to 3.

E. Experimental Example 2

According to the above manufacturing method, the three-terminal multilayer ceramic capacitor in FIG. 15 was prepared as follows, and the ESL was measured.

(a) Specification of Sample of Experimental Example 2

The three-terminal multilayer ceramic capacitors having the following specifications were prepared as an experimental example 2. The specifications of the prepared sample were as follows.
Dimension of three-terminal multilayer ceramic capacitor (design value): L×W×T=1.136 mm×0.632 mm×0.361 mm
Material of main component of dielectric layer: $BaTiO_3$
Capacitance: 7.29 μF
Rated voltage: 4V
Layer thickness (thickness B) of dielectric layer: See Table 1
Electrode material of first internal electrode layer: Ni
Number of first internal electrode layers: 117 sheets
Thickness (thickness C) of first internal electrode layer: 0.56 μm Regarding the thickness of the dielectric layer located between the pair of adjacent first end surface-side drawn electrode portions (total 117), thickness A1 on the first end surface side was fixed to about 1.94 μm, and thickness A2 on the second end surface side was fixed to about 1.97 μm, for example.

The first bent portion and the second bent portion bent toward the mounting substrate side as viewed in width direction y were formed in the first end surface-side drawn electrode portion (117 in total) and the second end surface-side drawn electrode portion (117 in total), and the third bent portion and the fourth bent portion bent toward the mounting substrate side as viewed in width direction y were formed in the first side surface-side drawn electrode portion (117 in total) and the second side surface-side drawn electrode portion (117 in total).

In the sample of sample number 4, when A3 is the thickness of the dielectric layer 12 located between first side surface 10c and second internal electrode layer 22 adjacent in multilayer direction x located at the position of ½ of the dimension in width direction y between first side surface 10c and the outermost surface of inner layer portion 14 on the side of first side surface 10c, when A4 is the thickness of dielectric layer 12 located between second side surface 10d and first internal electrode layer 21 adjacent in multilayer direction x located at the position of ½ of the dimension in width direction y between second side surface 10d and the outermost surface of inner layer portion 14 on the side of second side surface 10d, when B is the thickness of dielectric layer 12 located between first internal electrode layer 21 and second internal electrode layer 22 adjacent in multilayer direction x located at the central portion of inner layer portion 14, and when C is the thicknesses of first internal electrode layers 21 or second internal electrode layers 22 adjacent in multilayer direction x located at the central portion of inner layer portion 14, a relationship of A3>2×B+C and A4>2×B+C is satisfied.

The sample of sample number 5 had a relationship of A3≈2×B+C and A4≈2×B+C with respect to thicknesses A3 and A4, thickness B, and thickness C.

Sample number 6 had a relationship of A3<2×B+C and A4<2×B+C with respect to thicknesses A3 and A4, thickness B, and thickness C.

(b) Method for Measuring Thicknesses A3 and A4

Thicknesses A3 and A4 were measured as follows. Each of thicknesses A1, A2, B, C was the same as the measurement method described in experimental example 1.
Method for Measuring A3

Thickness A3 of the dielectric layer located between the second internal electrode layer adjacent in the multilayer direction located at the position of ½ of the width direction dimension of the first side surface-side outer layer portion was measured by the following method.

That is, first, the section of the three-terminal multilayer ceramic capacitor was exposed. Specifically, the polishing was performed until reaching the position of ½ L of the three-terminal multilayer ceramic capacitor, and the polishing was performed so as to be parallel or substantially parallel to the end surface, thereby exposing the WT section. Subsequently, the thickness of the dielectric layer positioned between the second internal electrode layers adjacent in the multilayer direction positioned at the position of ½ of the length direction dimension of the first side surface-side outer layer portion in the polished section was measured using the scanning electron microscope (SEM). At this point, the thicknesses of the total of 10 dielectric layers from a first principal surface side or a second principal surface side of the dielectric layers located between the second internal electrode layers adjacent to each other of the first side surface-side outer layer portion are measured, and the average value thereof is taken as the dimension of A3 of one three-terminal multilayer ceramic capacitor.

Method for Measuring A4

Thickness A4 of the dielectric layer located between the second internal electrode layer adjacent in the multilayer direction located at the position of ½ of the width direction dimension of the second side surface-side outer layer portion was measured by the following method.

That is, first, the section of the three-terminal multilayer ceramic capacitor was exposed. Specifically, the polishing was performed until reaching the position of ½ L of the three-terminal multilayer ceramic capacitor, and the polishing was performed so as to be parallel or substantially parallel to the end surface, thereby exposing the WT section. Subsequently, the thickness of the dielectric layer positioned between the second internal electrode layers adjacent in the multilayer direction positioned at the position of ½ of the Length Direction Dimension of the first side surface-side outer layer portion in the polished section was measured using the scanning electron microscope (SEM). At this time, the total of 10 layers from a first principal surface side or a second principal surface side of the dielectric layer located between the second internal electrode layers adjacent in the second side surface-side outer layer portion were measured, and averaged to obtain the dimension of A4 of one three-terminal multilayer ceramic capacitor.

(c) Method for Measuring ESL

The sample of each sample number of experimental example 2 was mounted on the mounting substrate including the mounting surface to produce the sample of the circuit board. Voltage was applied to each external electrode through the land of the circuit board, and the ESL value was measured. Specifically, the voltage was applied to each external electrode, and the ESL value of each sample at a frequency of 100 MHz was measured using a network analyzer (Company name: Agilent Technologies, model number: E5071B). The number of samples of each sample number was 5. Then, the ESL value of the sample of each sample number was calculated as an average value of five samples. The criteria for determining passed products were set less than or equal to 110 pH.

(d) Result

Table 2 illustrates the ESL measurement results for the samples of sample numbers 4 to 6.

TABLE 2

| Sample number | Presence of bent portion in second internal electrode layer | Thickness A3 (μm) | Thickness A4 (μm) | Thickness B (μm) | Thickness C (μm) | 2 × B + C (μm) | Relationship between A3, A4 and 2 × B + C | ESL (pH) |
|---|---|---|---|---|---|---|---|---|
| 4 | Present | 1.99 | 198 | 0.59 | 0.55 | 1.73 | A3 > 2 × B + C<br>A4 > 2 × B + C | 105 |
| 5 | Present | 1.75 | 1.73 | 0.59 | 0.56 | 1.74 | A3 ≈ 2 × B + C<br>A4 ≈ 3 × B + C | 109 |
| 6 | Present | 1.58 | 1.56 | 0.58 | 0.56 | 1.72 | A3 < 2 × B + C<br>A4 < 4 × B + C | 112 |

From the results in Table 2, in the sample of sample number 6, when A1 is the thickness of the dielectric layer located between the first end surface and the first internal electrode layer adjacent in multilayer direction x located at the position of ½ of the dimension in length direction z between the first end surface and the outermost surface of the inner layer portion on the first end surface side, A2 is the thickness of the dielectric layer located between the second end surface and the first internal electrode layer adjacent in multilayer direction x located at the position of ½ of the dimension in length direction z between the second end surface and the outermost surface of the inner layer portion on the second end surface side, B is the thickness of the dielectric layer located between the first internal electrode layer and the second internal electrode layer adjacent in multilayer direction x located at the central portion of the inner layer portion, and C is the thickness of the first internal electrode layer or the second internal electrode layer adjacent to each other in multilayer direction x located in the central portion of the inner layer portion, the sample of sample number 1 has the conditions of A1>2×B+C and A2>2×B+C; and when A3 is the thickness of the dielectric layer located between the first side surface 10c and the second internal electrode layers adjacent in multilayer direction x located at the position of ½ of the dimension in width direction y between the first side surface 10c and the outermost surface of the inner layer portion 14 on the first side surface side, A4 is the thickness of the dielectric layer located between the second side surface and the first internal electrode layer adjacent in multilayer direction x located at the position of ½ of the dimension in width direction y between the second side surface and the outermost surface of the inner layer portion on the second side surface side, B is the thickness of the dielectric layer located between the first internal electrode layer and the second internal electrode layer adjacent in multilayer direction x located at the central portion of the inner layer portion, and C is the thickness of the first internal electrode layer or the second internal electrode layer adjacent in multilayer direction x located at the central portion of the inner layer portion, the conditions of A3>2×B+C and A4>2×B+C were satisfied, so that the best ESL was obtained among the samples of sample numbers 1 to 6.

In addition, in all of sample numbers 1 to 3, when the bent portion is provided in the end surface-side drawn electrode portion while the bent portion is provided in the side surface-side drawn electrode portion, it was checked from the results of ESR of each sample of sample numbers 4 to 6 that the relationship between "A3 and A4" and "2×B+C" can affect the ESL of the multilayer ceramic capacitor.

As described above, the preferred embodiments of the present invention are disclosed in the above description, but the present invention is not limited thereto.

Furthermore, one of a set of first end surface-side drawn electrode portions 25a to 25d and a set of second end surface-side drawn electrode portions 27a to 27d of first internal electrode layers 21a to 21d may include the bent portion.

Similarly, either one of a set of first side surface-side drawn electrode portions 26a to 26d and the set of second side surface-side drawn electrode portions 28a to 28d of second internal electrode layers 22a to 22d may include the bent portion.

Furthermore, for each of the set of first end surface-side drawn electrode portions 25a to 25d and the set of second end surface-side drawn electrode portions 27a to 27d of first internal electrode layers 21a to 21d, some drawn electrode portions included in the set may include bent portions.

Similarly, for each of the set of first side surface-side drawn electrode portions 26a to 26d and the set of second side surface-side drawn electrode portions 28a to 28d of second internal electrode layers 22a to 22d, some drawn electrode portions included in the set may include bent portions.

As described above, the bent portion of preferred embodiments of the present invention may be provided in all or a portion of the plurality of internal electrode layers included in the multilayer body so as to be bent toward the mounting surface to which the external electrode is connected from the boundary between the counter electrode portion and the drawn electrode portion to the drawn electrode portion, and is not limited by other specific configurations.

That is, in preferred embodiments of the present invention, various changes can be made in the mechanism, shape, material, quantity, position, disposition, and the like with respect to the preferred embodiments described above without departing from the scope of the technical idea and object of the present invention, and these changes are included in the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body that includes a plurality of laminated dielectric layers and a plurality of internal electrode layers laminated on the dielectric layers, and includes a first principal surface and a second principal surface facing each other in a multilayer direction, a first side surface and a second side surface facing each other in a width direction perpendicular or substantially perpendicular to the multilayer direction, and a first end surface and a second end surface facing each other in a length direction perpendicular or substantially perpendicular to the multilayer direction and the width direction;
a first external electrode on the first end surface;
a second external electrode on the second end surface;
a third external electrode on the first side surface; and
a fourth external electrode on the second side surface; wherein
the multilayer body includes an inner layer portion in which the plurality of internal electrode layers are opposite to each other;
the plurality of internal electrode layers include a first internal electrode layer and a second internal electrode layer;
the first internal electrode layer includes a first counter electrode portion opposite to the second internal electrode layer, a first drawn electrode portion that extends from the first counter electrode portion to the first end surface, and a second drawn electrode portion that extends from the first counter electrode portion to the second end surface;
the second internal electrode layer includes a second counter electrode portion opposite to the first internal electrode layer, a third drawn electrode portion that extends from the second counter electrode portion to the first side surface, and a fourth drawn electrode portion that extends from the second counter electrode portion to the second side surface;
the first drawn electrode portion includes a first bent portion;
the second drawn electrode portion includes a second bent portion;
a portion or an entirety of the first drawn electrode portion is bent and disposed, by the first bent portion, so as to face one of the first principal surface and the second principal surface;
a portion or an entirety of the second drawn electrode portion is bent and disposed, by the second bent portion, so as to face one of the first principal surface and the second principal surface; and
a first end of the first internal electrode layer at the first end surface is shifted from the first counter electrode portion toward a side of one of the first and second principal surfaces in the multilayer direction, and a second end of the first internal electrode layer at the second end surface is shifted from the first counter electrode portion toward the side of the one of the first and second principal surfaces in the multilayer direction.

2. The multilayer ceramic capacitor according to claim 1, wherein
the first bent portion is closer to an inner layer portion side than a position of ½ of a dimension in the length direction between the first end surface and an outermost surface of the inner layer portion on a first end surface side; and the second bent portion is closer to an inner layer portion side than the position of ½ of a dimension in the length direction between the second end surface and an outermost surface of the inner layer portion on a second end surface side.

3. The multilayer ceramic capacitor according to claim 1, wherein
when A1 is a thickness of the dielectric layer located between the first internal electrode layers adjacent in the multilayer direction located at a position of ½ of a dimension in the length direction between the first end surface and an outermost surface of the inner layer portion on the first end surface side;
A2 is a thickness of the dielectric layer located between the first internal electrode layers adjacent in the multilayer direction located at a position of ½ of a dimension in the length direction between the second end surface and an outermost surface of the inner layer portion on the second end surface side;
B is a thickness of the dielectric layer located between the first internal electrode layer and the second internal electrode layer adjacent to each other in the multilayer direction located at a central portion of the inner layer portion; and
C is a thickness of the first internal electrode layer or the second internal electrode layer, the first internal electrode layer and the second internal electrode layer being adjacent to each other in the multilayer direction at the central portion of the inner layer portion;
a relationship of A1>2×B+C and A2>2×B+C is satisfied.

4. The multilayer ceramic capacitor according to claim 1, wherein
the third drawn electrode portion includes a third bent portion;
the fourth drawn electrode portion includes a fourth bent portion;
a portion or an entirety of the third drawn electrode portion is bent and disposed, by the third bent portion, so as to face one of the first principal surface and the second principal surface; and
a portion or an entirety of the fourth drawn electrode portion is bent and disposed, by the fourth bent portion, so as to face one of the first principal surface and the second principal surface.

5. The multilayer ceramic capacitor according to claim 4, wherein
the third bent portion is closer to an inner layer portion side than a position of ½ of a dimension in the width direction between the first side surface and an outermost surface of the inner layer portion on a first side surface side; and
the fourth bent portion is closer to an inner layer portion side than a position of ½ of a dimension in the width direction between the second side surface and an outermost surface of the inner layer portion on a second side surface side.

6. The multilayer ceramic capacitor according to claim 1, wherein
when A3 is a thickness of the dielectric layer located between the second internal electrode layers adjacent in the multilayer direction located at a position of ½ of a dimension in the width direction between the first side surface and an outermost surface of the inner layer portion on a first side surface side;
A4 is a thickness of the dielectric layer located between the first internal electrode layers adjacent in the multilayer direction located at a position of ½ of a dimension in the width direction between the second side surface and an outermost surface of the inner layer portion on a second side surface side;
B is a thickness of the dielectric layer located between the first internal electrode layer and the second internal electrode layer adjacent to each other in the multilayer direction located at a central portion of the inner layer portion; and
C is a thickness of the first internal electrode layer or the second internal electrode layer, the first internal electrode layer and the second internal electrode layer being adjacent to each other in the multilayer direction at the central portion of the inner layer portion;
a relationship of A3>2×B+C and A4>2×B+C is satisfied.

7. The multilayer ceramic capacitor according to claim 1, wherein the multilayer ceramic capacitor is a three-terminal multilayer ceramic capacitor.

8. The multilayer ceramic capacitor according to claim 1, wherein the first bent portion and the second bent portion are bent in a same direction.

9. The multilayer ceramic capacitor according to claim 1, wherein the first bent portion and the second bent portion are bent in a different direction.

10. The multilayer ceramic capacitor according to claim 1, wherein an angle defined by the first bent portion between the first counter electrode portion and a first end surface-side drawn electrode portion is greater than or equal to about 0.1° and less than or equal to about 40.0°, and an angle defined by the second bent portion between the second counter electrode portion and a second end surface-side drawn electrode portion is greater than or equal to about 0.1° and less than or equal to about 40.0°.

11. A mounting structure of a multilayer ceramic capacitor, the mounting structure comprising:
a mounting substrate; and
a multilayer ceramic capacitor mounted on the mounting substrate; wherein
the multilayer ceramic capacitor is the multilayer ceramic capacitor according to claim 1;
the mounting substrate includes:
a core material;
a first connection conductor connected to the first external electrode on the core material;
a second connection conductor connected to the second external electrode on the core material;
a third connection conductor connected to the third external electrode on the core material; and
a fourth connection conductor connected to the fourth external electrode on the core material; and
the multilayer ceramic capacitor is mounted such that the first principal surface or the second principal surface faces a mounting substrate side and such that a distance between the first drawn electrode portion and the second drawn electrode portion drawn to the first end surface and the second end surface closest to the first principal surface or closest to the second principal surface and a mounting surface of the mounting substrate is a shortest distance.

12. The mounting structure of the multilayer ceramic capacitor according to claim 11, wherein
the third drawn electrode portion includes a third bent portion;
the fourth drawn electrode portion includes a fourth bent portion;

a portion or an entirety of the third drawn electrode portion is bent and disposed, by the third bent portion, so as to face one of the first principal surface and the second principal surface;

a portion or an entirety of the fourth drawn electrode portion is bent and disposed, by the fourth bent portion, so as to face one of the first principal surface and the second principal surface; and the multilayer ceramic capacitor is mounted such that the first principal surface or the second principal surface faces the mounting substrate side and such that a distance between the third drawn electrode portion and the fourth drawn electrode portion drawn to the first side surface and the second side surface closest to the first principal surface or closest to the second principal surface and the mounting surface of the mounting substrate is the shortest distance.

13. The mounting structure of the multilayer ceramic capacitor according to claim 12, wherein the third bent portion is closer to an inner layer portion side than a position of ½ of a dimension in the width direction between the first side surface and an outermost surface of the inner layer portion on a first side surface side; and the fourth bent portion is closer to an inner layer portion side than a position of ½ of a dimension in the width direction between the second side surface and an outermost surface of the inner layer portion on a second side surface side.

14. The mounting structure of the multilayer ceramic capacitor according to claim 11, wherein the first bent portion is closer to an inner layer portion side than a position of ½ of a dimension in the length direction between the first end surface and an outermost surface of the inner layer portion on a first end surface side; and the second bent portion is closer to an inner layer portion side than the position of ½ of a dimension in the length direction between the second end surface and an outermost surface of the inner layer portion on a second end surface side.

15. The mounting structure of the multilayer ceramic capacitor according to claim 11, wherein when A1 is a thickness of the dielectric layer located between the first internal electrode layers adjacent in the multilayer direction located at a position of ½ of a dimension in the length direction between the first end surface and an outermost surface of the inner layer portion on the first end surface side;

A2 is a thickness of the dielectric layer located between the first internal electrode layers adjacent in the multilayer direction located at a position of ½ of a dimension in the length direction between the second end surface and an outermost surface of the inner layer portion on the second end surface side;

B is a thickness of the dielectric layer located between the first internal electrode layer and the second internal electrode layer adjacent to each other in the multilayer direction located at a central portion of the inner layer portion; and C is a thickness of the first internal electrode layer or the second internal electrode layer, the first internal electrode layer and the second internal electrode layer being adjacent to each other in the multilayer direction at the central portion of the inner layer portion;

a relationship of $A1>2\times B+C$ and $A2>2\times B+C$ is satisfied.

16. The mounting structure of the multilayer ceramic capacitor according to claim 11, wherein when A3 is a thickness of the dielectric layer located between the second internal electrode layers adjacent in the multilayer direction located at a position of ½ of a dimension in the width direction between the first side surface and an outermost surface of the inner layer portion on a first side surface side;

A4 is a thickness of the dielectric layer located between the first internal electrode layers adjacent in the multilayer direction located at a position of ½ of a dimension in the width direction between the second side surface and an outermost surface of the inner layer portion on a second side surface side;

B is a thickness of the dielectric layer located between the first internal electrode layer and the second internal electrode layer adjacent to each other in the multilayer direction located at a central portion of the inner layer portion; and C is a thickness of the first internal electrode layer or the second internal electrode layer, the first internal electrode layer and the second internal electrode layer being adjacent to each other in the multilayer direction at the central portion of the inner layer portion;

a relationship of $A3>2\times B+C$ and $A4>2\times B+C$ is satisfied.

17. The mounting structure of the multilayer ceramic capacitor according to claim 11, wherein the multilayer ceramic capacitor is a three-terminal multilayer ceramic capacitor.

18. The mounting structure of the multilayer ceramic capacitor according to claim 11, wherein the first bent portion and the second bent portion are bent in a same direction.

19. The mounting structure of the multilayer ceramic capacitor according to claim 11, wherein the first bent portion and the second bent portion are bent in a different direction.

20. The mounting structure of the multilayer ceramic capacitor according to claim 11, wherein an angle defined by the first bent portion between the first counter electrode portion and a first end surface-side drawn electrode portion is greater than or equal to about 0.1° and less than or equal to about 40.0°, and an angle defined by the second bent portion between the second counter electrode portion and a second end surface-side drawn electrode portion is greater than or equal to about 0.1° and less than or equal to about 40.0°.

* * * * *